(12) United States Patent
Zuraski

(10) Patent No.: US 8,839,650 B2
(45) Date of Patent: Sep. 23, 2014

(54) PORTABLE LOCK WITH MODULAR CABLE

(76) Inventor: Robert David Zuraski, Taunton, MA (US)

( * ) Notice: Subject to any disclaimer, the term of this patent is extended or adjusted under 35 U.S.C. 154(b) by 591 days.

(21) Appl. No.: 13/000,686

(22) PCT Filed: Jun. 23, 2009

(86) PCT No.: PCT/US2009/048226
§ 371 (c)(1),
(2), (4) Date: Jun. 14, 2011

(87) PCT Pub. No.: WO2009/158326
PCT Pub. Date: Dec. 30, 2009

(65) Prior Publication Data

US 2011/0265526 A1    Nov. 3, 2011

Related U.S. Application Data

(60) Provisional application No. 61/075,600, filed on Jun. 25, 2008, provisional application No. 61/098,961, filed on Sep. 22, 2008.

(51) Int. Cl.
*E05B 67/24* (2006.01)
*E05B 47/06* (2006.01)
*B62H 5/00* (2006.01)
*E05B 67/00* (2006.01)
*E05B 47/00* (2006.01)
*E05B 67/38* (2006.01)
*E05B 71/00* (2006.01)

(52) U.S. Cl.
CPC ........... *E05B 67/003* (2013.01); *E05B 47/0012* (2013.01); *B62H 5/003* (2013.01); *E05B 2067/386* (2013.01); *E05B 2047/0094* (2013.01); *E05B 71/00* (2013.01); *E05B 2047/002* (2013.01)

USPC ........... 70/30; 70/21; 70/26; 70/38 A; 70/39; 70/49; 70/52; 70/53; 70/264; 70/278.7; 70/279.1

(58) Field of Classification Search
USPC ........ 70/38 A, 49, 52, 53, 262–264, DIG. 63, 70/14, 20, 21, 120, 24–26, 28, 30, 35–37, 70/38 R, 39, 43, 277, 278.3, 278.7, 279.1, 70/283.1
See application file for complete search history.

(56) References Cited

U.S. PATENT DOCUMENTS

| | | | | |
|---|---|---|---|---|
| 695,458 | A | * | 3/1902 | Hulzer et al. ..................... 70/15 |
| 1,355,387 | A | * | 10/1920 | Cohen ............................... 70/29 |

(Continued)

FOREIGN PATENT DOCUMENTS

| | | |
|---|---|---|
| DE | 201 18 686 | 3/2002 |
| DE | 20 2004 005 928 U1 | 7/2004 |

(Continued)

OTHER PUBLICATIONS

International Search Report for PCT/US2009/048226 mailed May 26, 2010.

(Continued)

*Primary Examiner* — Lloyd Gall
(74) *Attorney, Agent, or Firm* — RatnerPrestia

(57) ABSTRACT

A lock assembly (210) including a body (220), at least one locking member (223, 240) and a length of lock material with two free ends and at least one leg (212) attached to one of the free ends, each leg configured to be engaged by a respective locking member. The locking members are separately actuable such that each leg (212) may be removed from the lock body independent of any other legs. A bracket assembly (300) for connecting a lock assembly (210) to a bicycle or the like. The bracket includes a bracket body (310) with a strap (330) that is secured via a pivotal buckle (340). The bracket body (310) includes at least one flange (320, 322) configured to slidably engage a groove (250, 252) provided along the lock assembly (210).

6 Claims, 30 Drawing Sheets

(56) References Cited

U.S. PATENT DOCUMENTS

| | | | |
|---|---|---|---|
| 1,445,719 A * | 2/1923 | Rozycki | 70/26 |
| 1,486,037 A * | 3/1924 | Rousseau | 70/437 |
| 1,679,665 A * | 8/1928 | Junkunc | 70/260 |
| 1,719,637 A * | 7/1929 | Werner | 70/38 A |
| 1,901,613 A * | 3/1933 | Smith | 70/259 |
| 2,508,302 A * | 5/1950 | Stue | 70/19 |
| 3,720,083 A * | 3/1973 | Wellekens | 70/38 A |
| 3,738,132 A * | 6/1973 | Nagel | 70/49 |
| 4,038,845 A * | 8/1977 | Szlakman | 70/211 |
| 4,070,879 A * | 1/1978 | Thompson | 70/20 |
| 4,811,577 A * | 3/1989 | Webster et al. | 70/14 |
| 5,189,893 A * | 3/1993 | Kortenbrede | 70/38 A |
| 5,372,019 A * | 12/1994 | Hsiao | 70/38 A |
| 5,398,529 A * | 3/1995 | Goldman et al. | 70/38 A |
| 5,440,904 A * | 8/1995 | Su | 70/18 |
| 5,505,064 A * | 4/1996 | Wang | 70/53 |
| 5,561,996 A * | 10/1996 | Chang | 70/247 |
| 5,832,753 A * | 11/1998 | Nielsen | 70/38 A |
| 5,951,047 A * | 9/1999 | Dungan | 280/814 |
| 6,047,575 A * | 4/2000 | Larson et al. | 70/278.1 |
| 6,109,074 A * | 8/2000 | Du | 70/18 |
| 6,158,092 A | 12/2000 | Huang | |
| 6,360,571 B1 * | 3/2002 | O'Neal | 70/226 |
| 6,408,660 B1 * | 6/2002 | Lai | 70/30 |
| 6,508,086 B2 * | 1/2003 | Chen | 70/49 |
| 6,584,815 B2 | 7/2003 | Bremicker | |
| 6,761,051 B1 * | 7/2004 | Tsai | 70/38 B |
| 7,121,121 B2 * | 10/2006 | Wyers | 70/14 |
| 7,131,298 B1 | 11/2006 | Haraughty | |
| 8,225,629 B2 * | 7/2012 | Zuraski et al. | 70/21 |
| 2002/0053226 A1 * | 5/2002 | McDaid | 70/38 A |
| 2002/0073747 A1 * | 6/2002 | Chen | 70/49 |
| 2005/0199019 A1 * | 9/2005 | Marcelle et al. | 70/38 A |
| 2006/0150691 A1 * | 7/2006 | Truss | 70/39 |
| 2006/0283216 A1 * | 12/2006 | Marcelle et al. | 70/38 A |
| 2008/0036596 A1 | 2/2008 | Auerbach et al. | |
| 2012/0318028 A1 * | 12/2012 | Hahn | 70/41 |

FOREIGN PATENT DOCUMENTS

| | | |
|---|---|---|
| DE | 20 2006 006 503 U1 | 6/2006 |
| EP | 0 641 909 A2 | 3/1995 |
| GB | 2 373 018 | 9/2002 |
| JP | 63 201174 | 12/1988 |

OTHER PUBLICATIONS

European Search Report issued for EP 13 16 8128 mailed Sep. 17, 2013.

Partial European Search Report, dated Jun. 26, 2013, of corresponding European Patent Application No. 13168128.0, filed Jun. 23, 2009.

* cited by examiner

PORTABLE LOCK WITH MODULAR CABLE

BACKGROUND OF THE INVENTION

The present invention relates to a portable lock. In one aspect, the present invention relates to a portable lock with a modular design. In another aspect, the invention relates to a portable lock bracket assembly.

Bicycle locks include two primary types of locks. The first is a U-bolt type lock of the kind manufactured by Kryptonite Locks. The U-bolt type lock is essentially comprised of large, solid U-shaped bolt, which is typically made of hardened steel, and a padlock that attaches to the ends of the U-bolt. The lock is carried on the bicycle in a holder or bracket.

A second common type of bicycle lock is a cable lock. The cable is usually composed of twisted strands of steel wire. The cable wire is commonly encased in a plastic or rubber cover. The cable is normally coiled for convenience of storage. One end of the cable is permanently fixed to a lock body or casing. The second end of the cable includes a locking pin or bolt-like tip, which may be attached into and removed from the lock body when the locking mechanism is activated or deactivated. The locking mechanism typically includes a key operated lock, although some cable lock devices utilize a combination lock.

Various brackets exist in the bicycle market for both types of locks.

SUMMARY OF THE INVENTION

In at least one aspect, the present invention provides a lock assembly including a body, at least one locking member and a length of lock material with two free ends and at least one leg attached to one of the free ends, each leg configured to be engaged by a respective locking member. The locking members are separately actuable such that each leg may be removed from the lock body independent of any other legs.

In another aspect, the invention provides a bracket assembly for connecting a lock assembly to a bicycle or the like. The bracket includes a bracket body with a strap that is secured via a pivotal buckle. The bracket body includes at least one flange configured to slidably engage a groove provided along the lock assembly.

DETAILED DESCRIPTION OF THE INVENTION

Figure 1:
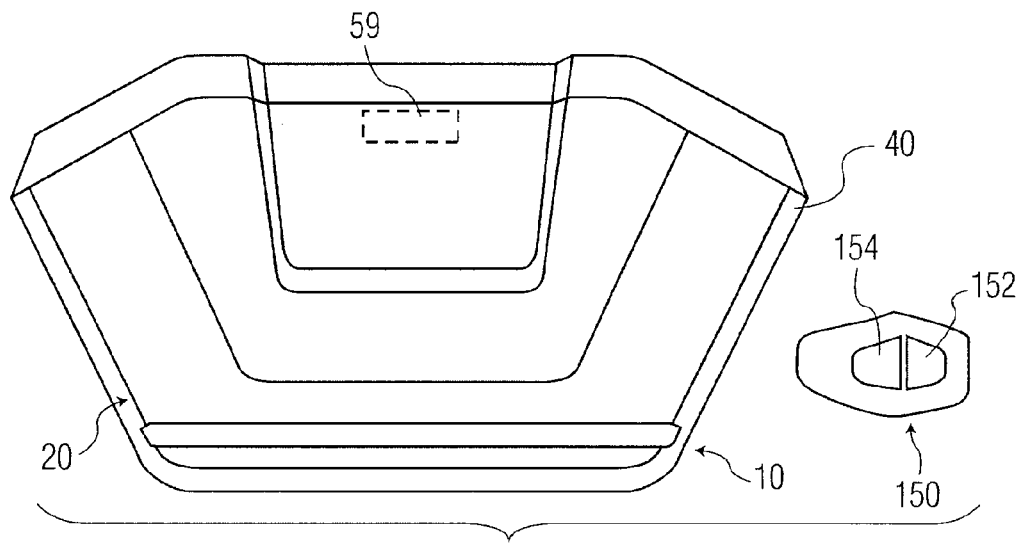
FIG. 1 is a front elevation view of a cable lock assembly in accordance with an embodiment of the present invention, with the cable removed for clarity.
Figure 2:
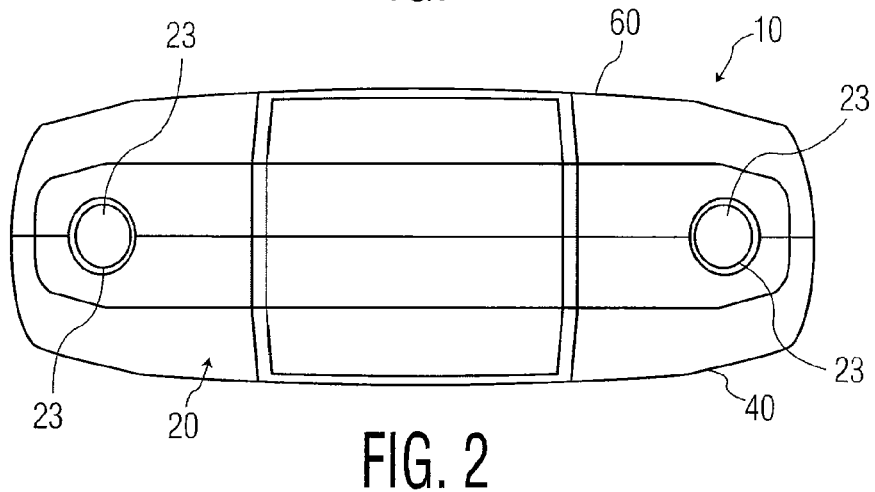
FIG. 2 is a top plan view of the cable lock assembly of FIG. 1.
Figure 3:
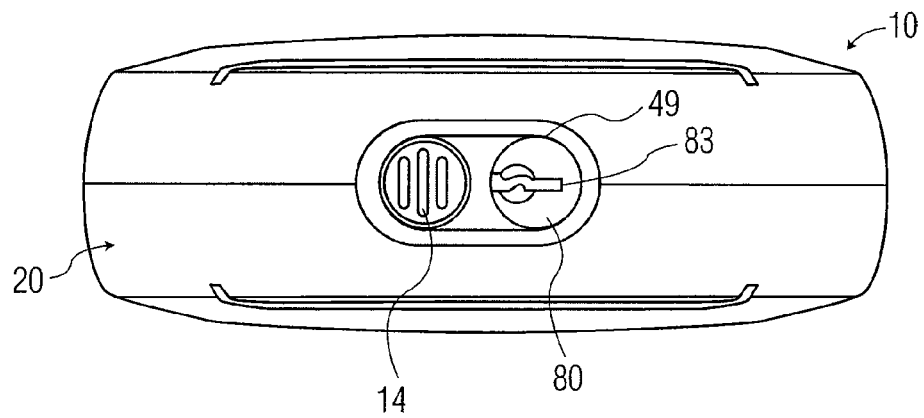
FIG. 3 is a bottom plan view of the cable lock assembly of FIG. 1.

Referring to FIGS. 1-10, a lock assembly 10 that is a first embodiment of the present invention will be described. The lock assembly 10 includes a lock body 20 which defines a pair of locking member openings 23. Each opening 23 is configured to receive a locking leg 12 (see FIGS. 7-10) of a cable lock. While the present invention is described with respect to a cable with a locking leg on each end, the invention is not limited to such. The cable may take any form of a length of lock material, for example, but not limited to, a cable or a chain, having two free ends, with at least one of the ends having a locking leg 12.

The lock body 20 includes an opening 49 in which is aligned the key slot 83 of a key lock cylinder 80 configured to receive a key (not shown) to unlock the lock assembly 10. As shown in phantom in FIG. 1, the lock assembly 10 also includes an electronic sensor 59, for example, an RF receiver, configured to receive an unlock signal from an electronic transmitter 150 which will then actuate an electronic drive as described in more detail below. The illustrated electronic transmitter 150 includes an unlock button 152 and a button 154 configured to operate a light on the transmitter 150, but such is not required. Additionally, an unlock button 152 may not be required, but instead, the sensor 59 may be configured to sense when the transmitter 150 is within a given range. While a sensor 59 is described, such is not required as the lock assembly 10 may be operated with a key, combination or any other mechanical or electrical lock mechanism.

Referring to FIGS. 4, 5 and 7-10, within the rear portion of the lock assembly 10 is a rear internal lock body 22. The rear internal lock body 22 includes a pair of opposed leg grooves 24 which align with the openings 23. Similar grooves 54 are provided on the front internal lock body 50. Adjacent to each leg groove 24 is a latch groove 26 configured to pivotally support a corresponding latch 72. Each latch 72 includes a body 74 extending between a contact end 75 and a engagement end 77. Posts 76 extend from the body 74 and pivotally support the latch 72 in the respective groove 26. A biasing spring 73 extends between the groove 26 and the body 74 to bias the latch 72 toward a locked position (see FIGS. 7 and 8). In this locked position, the engagement end 77 engages a forward channel 13 on a respective leg 12, thereby locking the leg 12 within the lock body 20.

A pair of release plates 110 and 112 are supported in a transverse support groove 32 extending in the front and rear internal bodies 50 and 22. In the locked position, the contact ends 75 of the latches 72 (e.g., contact members) contact the release plates 110 and 112 and, based on the springs 73, bias the plates 110 and 112 inward. An actuator mechanism 100 is positioned between the plates 110 and 112 and is configured to selectively urge the plates 110 and 112 outward, as described below, against the spring 73 bias to pivot the latches 72 about the posts 76 such that the engagement ends 77 disengage from the channels 13 (see FIGS. 9 and 10).

Referring to FIGS. 5, 7-10, the actuator mechanism 100 has a rotational body 102 with an engagement section 106 and a drive section 104 depending therefrom. The drive section 104 has a cross section configured to be received in and driven by either a key drive gear 86 or a key joining plate 84, as described below. The engagement section 106 has a double-D configuration, i.e. a narrow width w (see FIG. 7) in one orientation and a wider width W (see FIG. 9) in a second orientation. The second orientation is rotated 90° relative to the first orientation in the present embodiment, but the invention is not limited to such. In the unlocked position, the engagement portion 106 is in the first orientation such that the narrow width is between the plates 110 and 112. When the actuator mechanism 100 is rotated toward the second orientation, the wider width of the engagement portion 106 contacts the plates 110 and 112 and urges them outwardly to disengage the latches 72 as described above. The actuator mechanism 100 also includes a stop contact 108 the function of which is described below, which is moveable in a groove 34 within the body 20.

The actuator mechanism 100 may be driven by either the key lock cylinder 80 or an electronic actuator 90. The key lock cylinder 80 includes a drive plate 82 which is rotatable when a correctly cut key is inserted into the cylinder 80, as known in the art. The drive plate 82 contacts and thereby rotates a joining plate 84 which has a through hole 85 which matches the shape of the drive section 104. With the drive section 104 positioned in the through hole 85, rotation of the joining plate 84 via the drive plate 82 will cause rotation of the actuating mechanism 100.

A key drive gear 86 is positioned above the joining plate 84 and also includes a through hole 87 configured to receive the drive section 104. The key drive gear 86 is configured to engage a electronic drive gear 94 such that rotation of the electronic drive gear 94 will cause the key drive gear 86, and thereby the actuator mechanism 100 to rotate independent of the key cylinder 80. The electronic drive gear 94 has a through hole 95 configured to receive and be driven by the output shaft 92 of an electronic actuator 90. The electronic actuator 90 is powered by batteries or the like (not shown) in a power compartment 44 within the body 20. The electronic actuator 90 is configured to receive an unlock signal from the sensor 59 and will begin driving the shaft 92 when such is received. A stop sensor 120 (see FIG. 6) is provided to stop the electronic actuator 90 once the actuator mechanism 100 has been sufficiently rotated. The stop sensor 120 has a stop switch 122 which is aligned with the stop contact 108. In the unlocked position (FIGS. 7 and 8) the stop switch 122 is in a drive position such that the electronic actuator 90 is free to drive upon receiving an unlock signal. Once the actuator mechanism 100 has rotated to the unlocked position (FIGS. 9 and 10), the stop contact 108 engages the stop switch 122 which thereby sends a stop signal to the electronic actuator 90.

Figure 4:
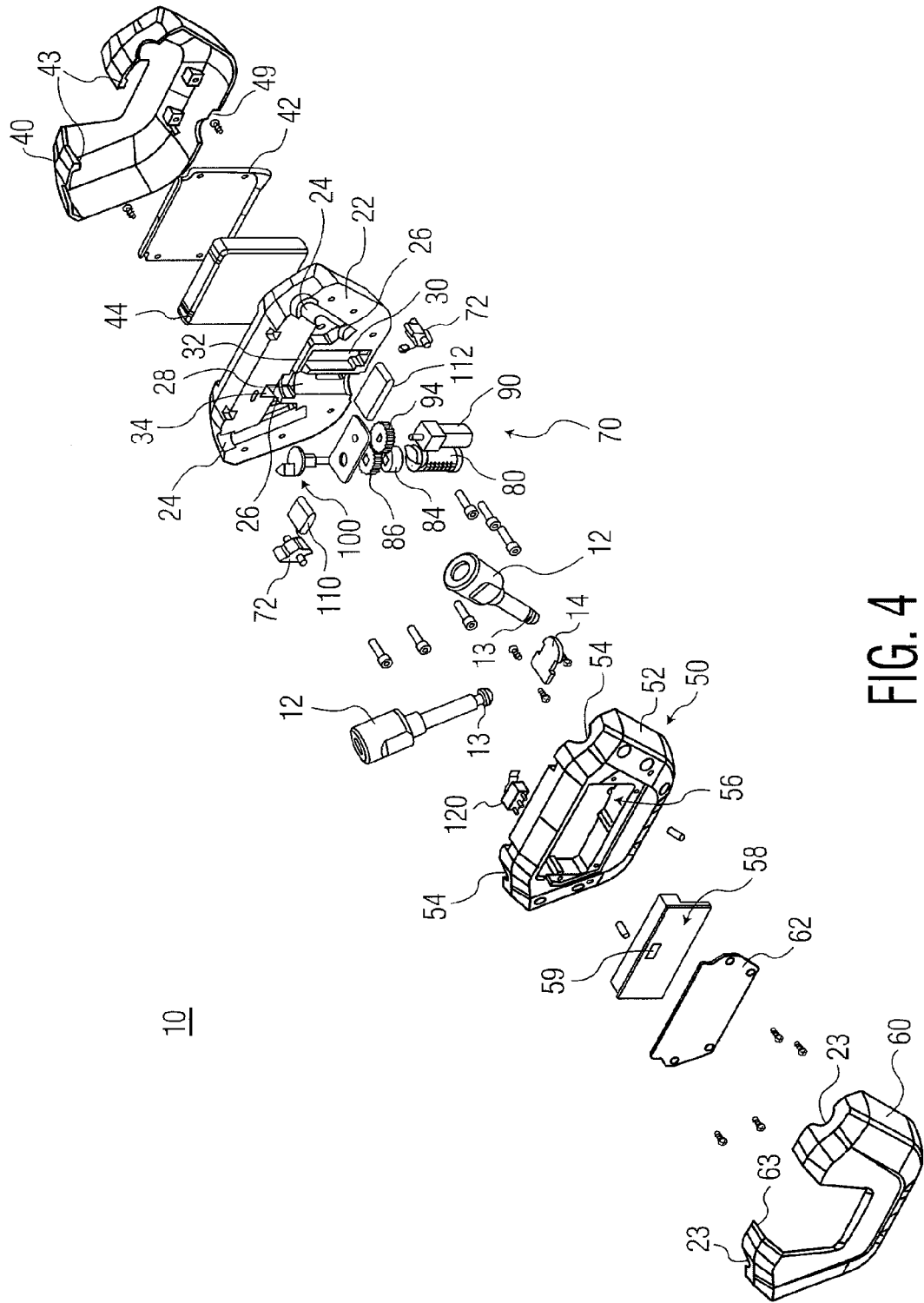
FIG. 4 is an exploded isometric view of the cable lock assembly of FIG. 1.
Figure 5:
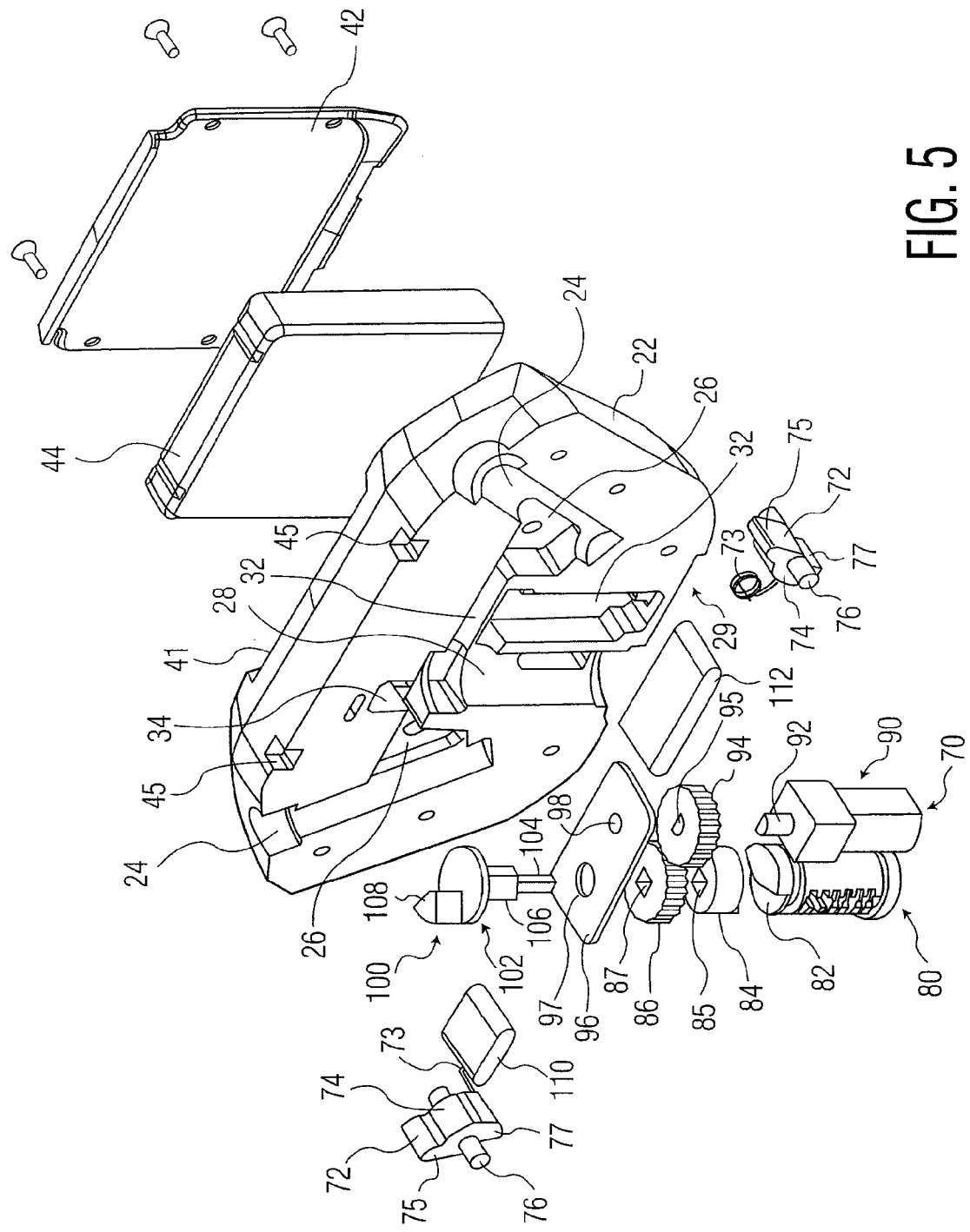
FIG. 5 is an exploded isometric view similar to FIG. 4 showing the rear portion of the lock assembly.
Figure 6:
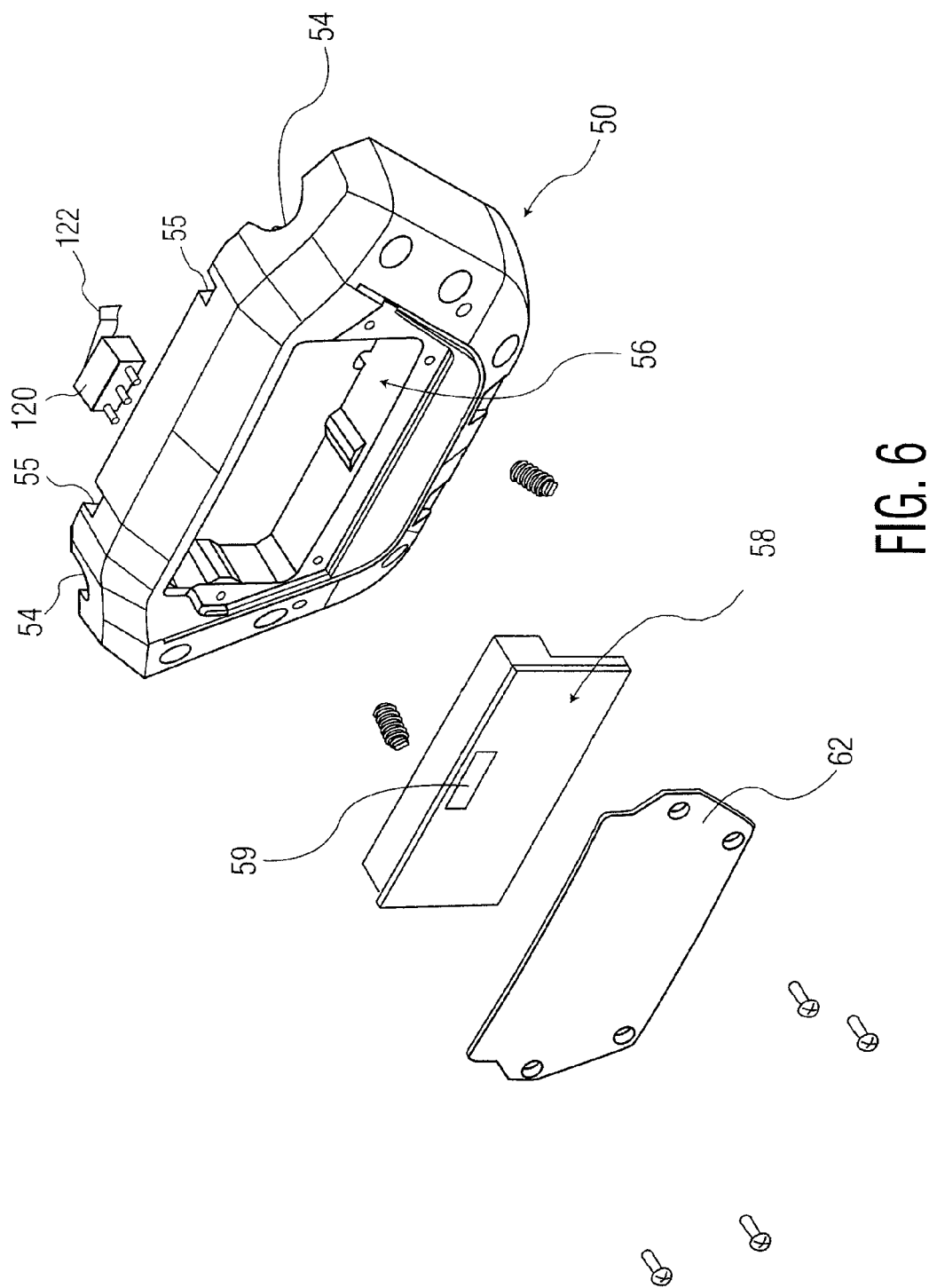
FIG. 6 is an exploded isometric view similar to FIG. 4 showing the front portion of the lock assembly.
Figure 7:
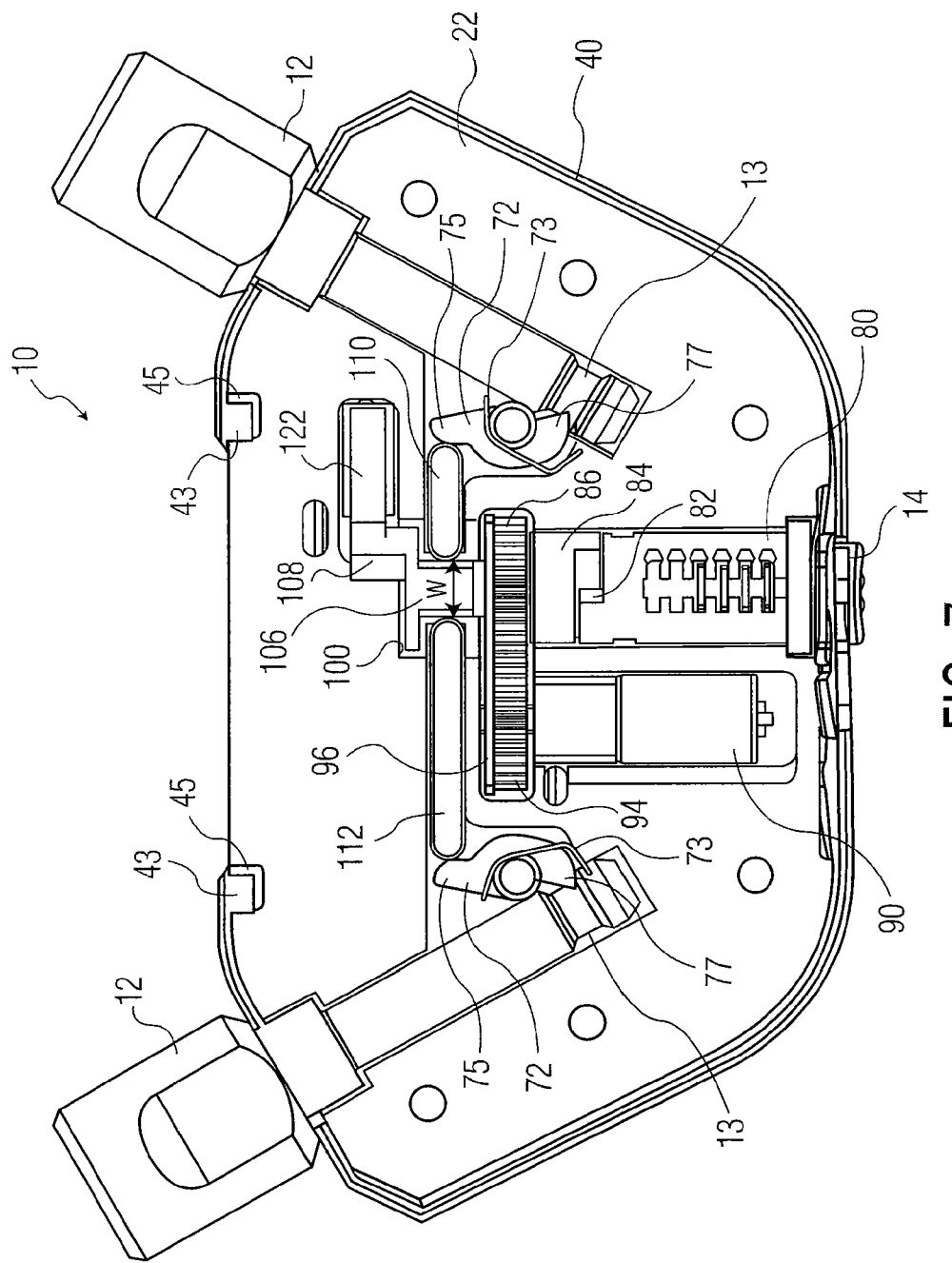
FIG. 7 is an assembled elevation view of the rear portion of the lock assembly of FIG. 1 in a locked condition.
Figure 8:
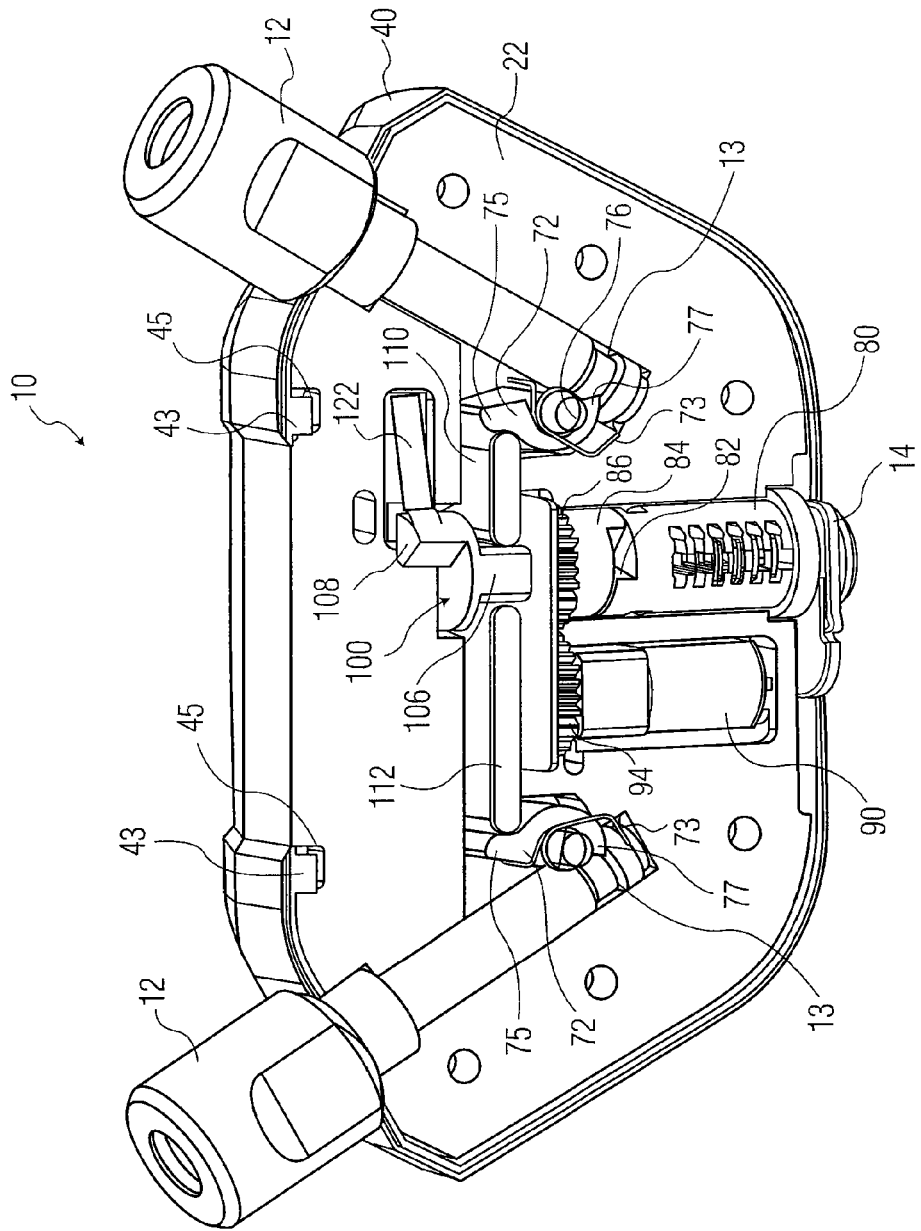
FIG. 8 is an assembled perspective view of the rear portion of the lock assembly of FIG. 1 in a locked condition.
Figure 9:
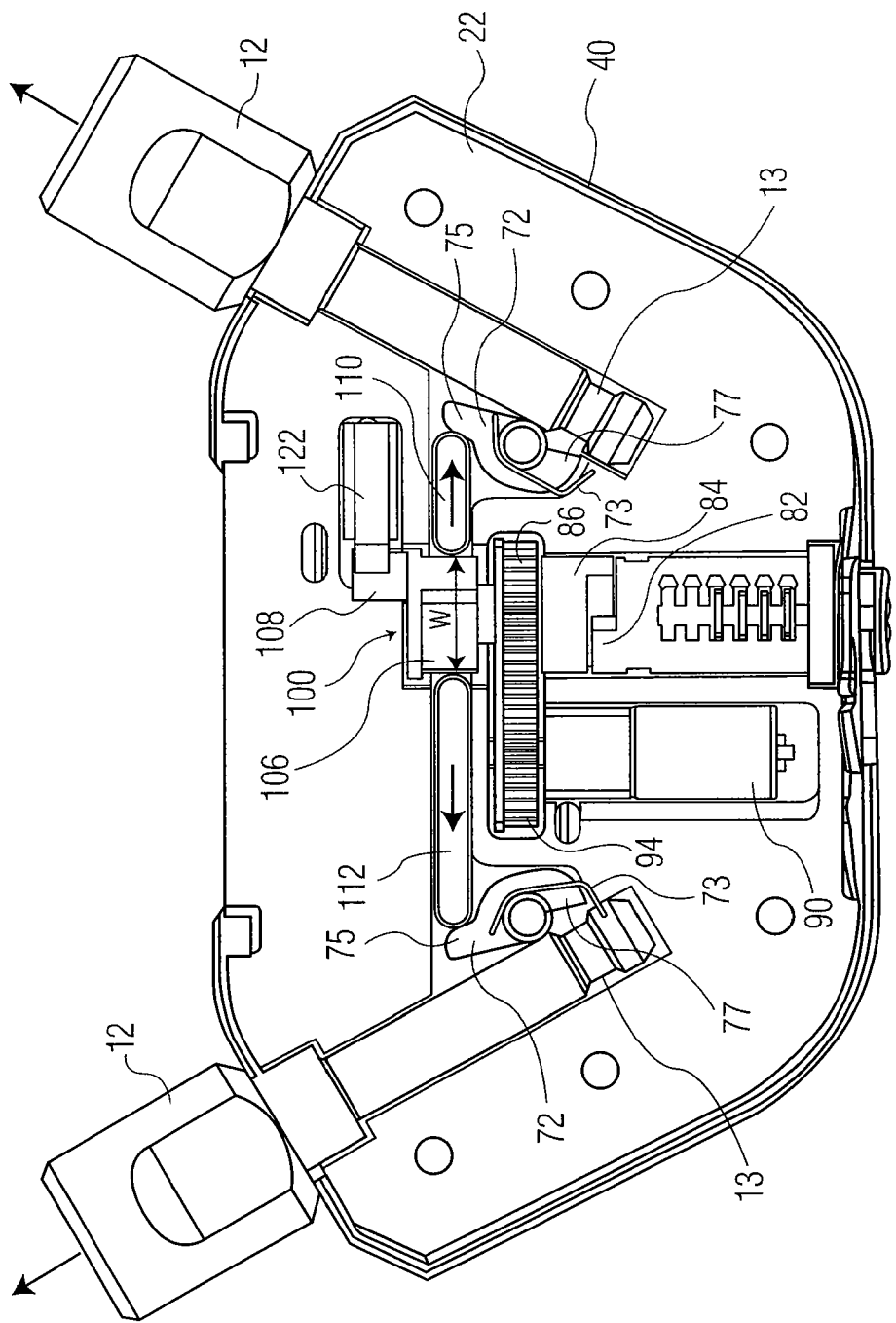
FIG. 9 is an assembled elevation view of the rear portion of the lock assembly of FIG. 1 in an unlocked condition.
Figure 10:
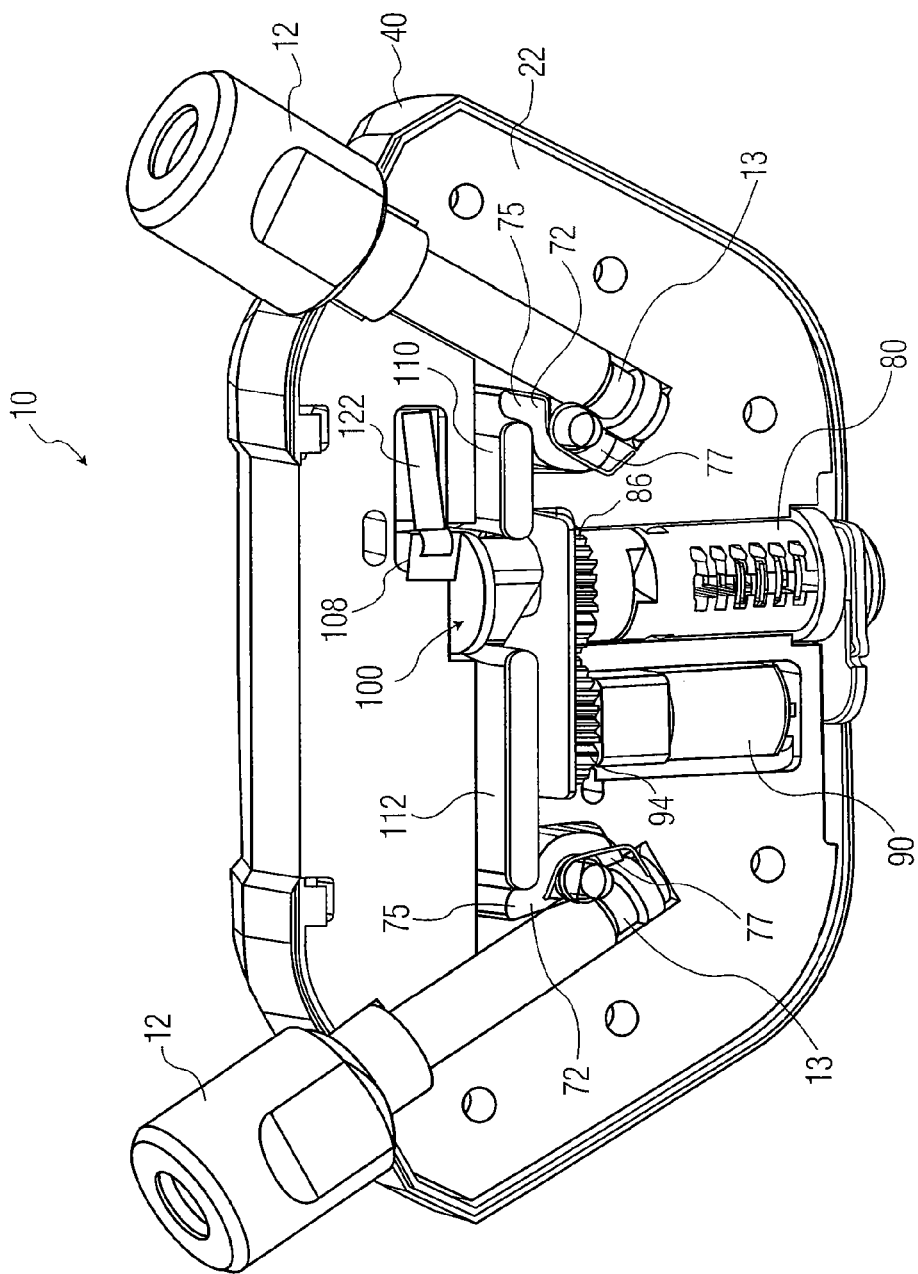
FIG. 10 is an assembled perspective view of the rear portion of the lock assembly is of FIG. 1 in an unlocked condition.
Figure 11:
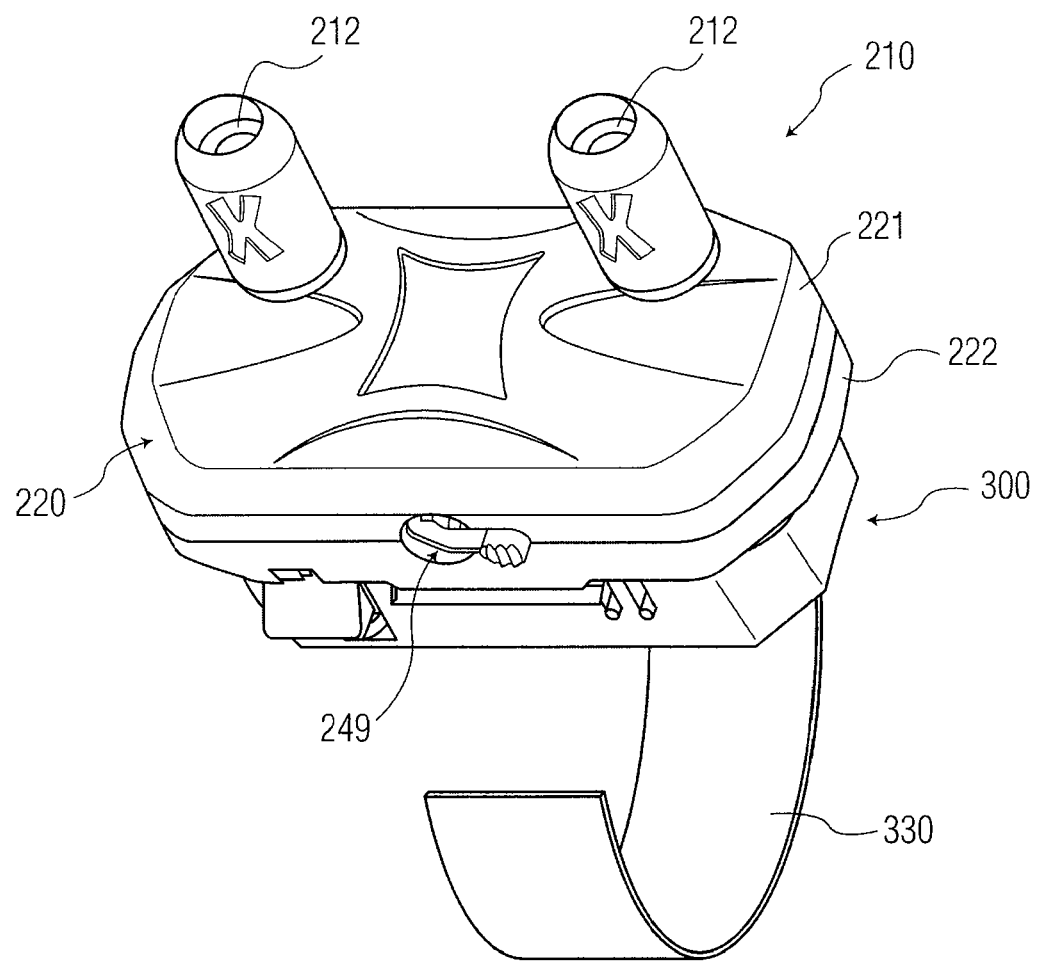
FIG. 11 is an isometric view of a lock assembly in accordance with an alternative embodiment of the present invention.
Figure 12:
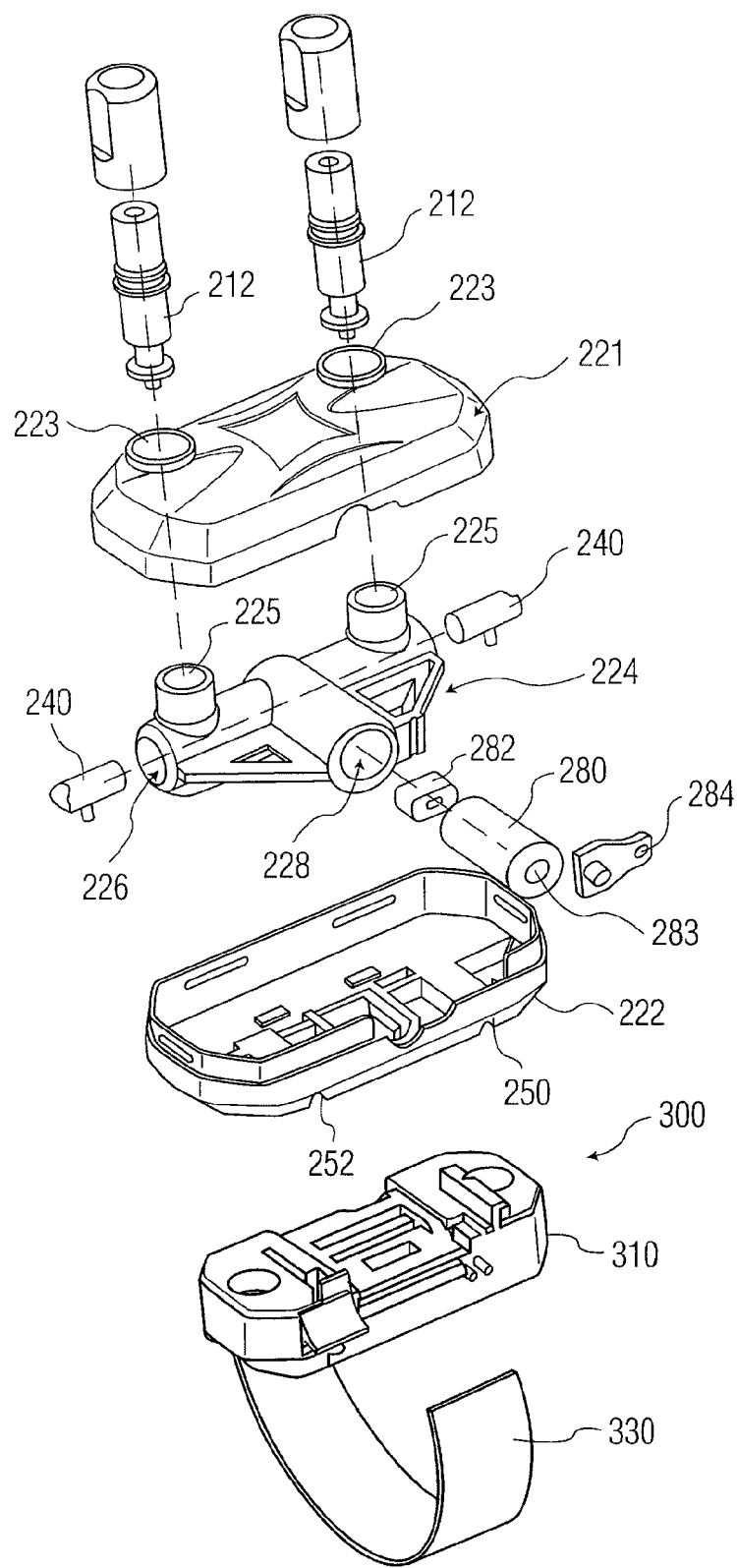
FIG. 12 is an exploded isometric view of the lock assembly of FIG. 11.
Figure 13:
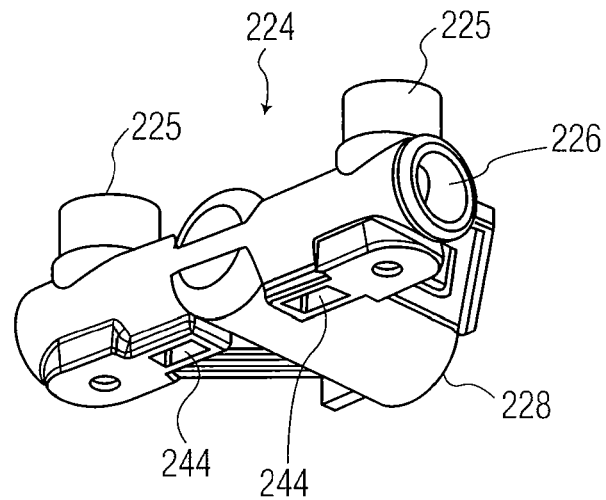
FIG. 13 is an isometric view of an exemplary inner housing of the lock assembly of FIG. 11.

Referring to FIGS. 4-6, the sensor 59 is supported by electronic control unit 58 which extends through an opening 56 in the front internal lock body 50. The stop sensor 120 is also supported in the front internal lock body 50. Securing plates 42 and 62 are preferably utilized to help secure the internal body components 22 and 50. Cover plates 40 and 60 enclose the internal body components 22 and 50. In the present embodiments the cover plates 40 and 60 includes tabs 43 and 63, respectively, configured to be received in notches 45 and 55, respectively, in the internal body components 22 and 50.

While the present embodiment is described with both an electronic actuator and a mechanical actuator, the lock assembly 10 may be formed with either actuator, exclusive of the other, or in combination as shown and described.

Referring to FIGS. 11-16, a lock assembly 210 that is an alternate embodiment of the invention is shown. The lock assembly 210 includes a lock body 220 defined by opposed cover members 221 and 222. A pair of locking member openings 223 are defined through cover member 221. Each opening 223 is configured to receive a locking leg 212 of a cable lock. The lock body 220 includes an opening 249 in which is aligned the key slot 283 of a key lock cylinder 280 configured to receive a key (not shown) to unlock the lock assembly 210. A cover 284 may be slidably positioned relative to the opening 249 to selectively cover the key slot 283. The lock assembly 210 of the present embodiment is described with a mechanical actuator, but may also or alternatively include an electronic actuator similar to that described above.

Positioned within the lock body 220 is an inner housing 224. The inner housing 224 defines a pair of leg openings 225 which align with the openings 223. A dead bolt passage 226 extends across the housing 224 perpendicular to and in communication with the leg openings 225. The dead bolt passage 226 is configured to axially support a pair of dead bolts 240 (e.g., contact members) as will be described in more detail hereinafter. A lock cylinder opening 228 extends perpendicular to the dead bolt passage 226 between the leg openings 225. The lock cylinder opening 228 is configured to receive the lock cylinder 280 such that a cam member 282 extending from the lock cylinder 280 is positioned within the dead bolt passage 226.

Referring to FIGS. 13-16, the dead bolts 240 are positioned within the dead bolt passage 226 on opposite sides of the cam member 282. Each dead bolt 240 is retained in the dead bolt passage 226 by a respective dead bolt pin 242 received in a bore 241 in the dead bolt 240. The opposite end of each dead bolt pin 242 is received in a respective guide slot 244 extending through the inner housing 224 thereby defining the range of motion of the respective dead bolt 240. A biasing member 246, for example, a spring or the like, is positioned in each guide slot 244 and biases the respective dead bolt 240 axially outward to the lock position shown in FIG. 14. Other spring configurations, for example, a spring positioned about the dead bolt 240, may also be used. For example, as shown in FIG. 14A, the dead bolt 240' has a reduced diameter body 243 with a shoulder 245 defined at the head of the dead bolt 240'. The biasing member 246 is positioned about the reduced diameter body 243 and extends between the shoulder 245 and a shoulder 227 defined in the dead bolt passage 226. In the locked position, a portion of the dead bolt 240 engages a forward channel 213 on a respective leg 212, thereby locking the leg 212 within the lock body 220.

Figure 14:
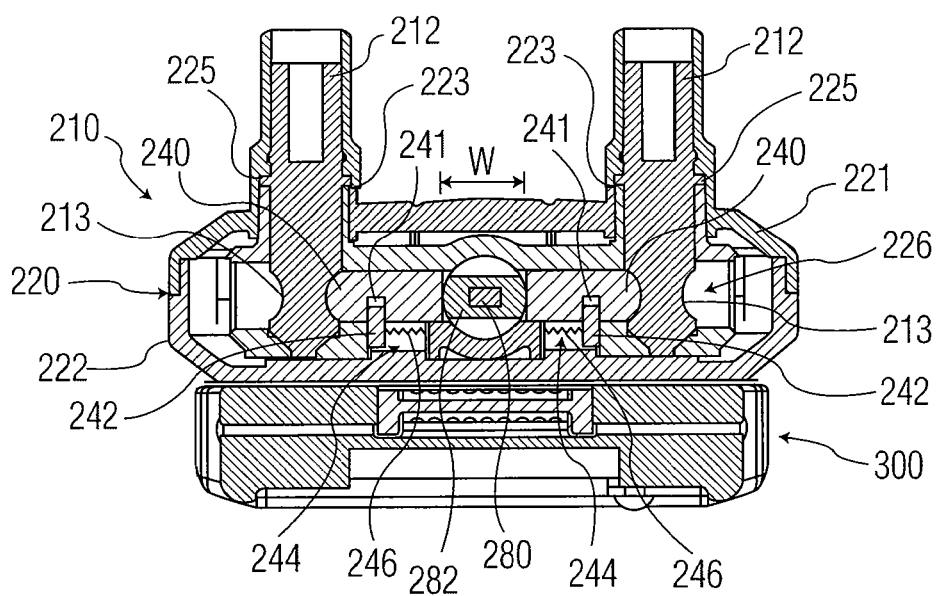
FIG. 14 is a cross-sectional view of the lock assembly of FIG. 11 in a locked condition.
Figure 14A:
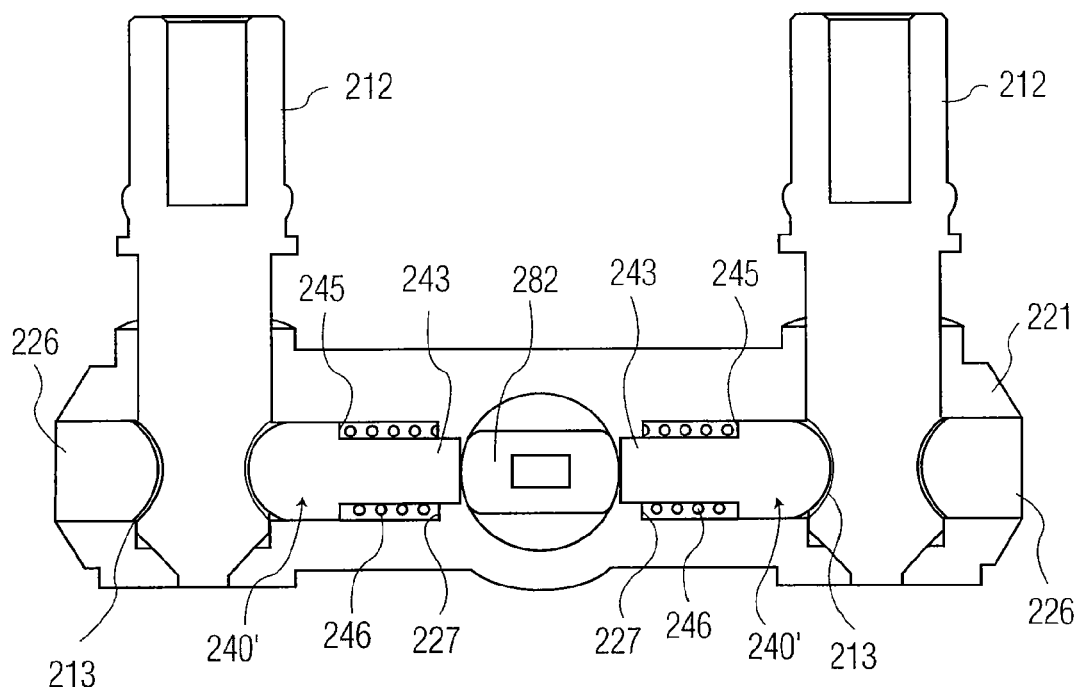
FIG. 14A is a cross-sectional view of an alternative lock assembly in a locked condition.
Figure 15:
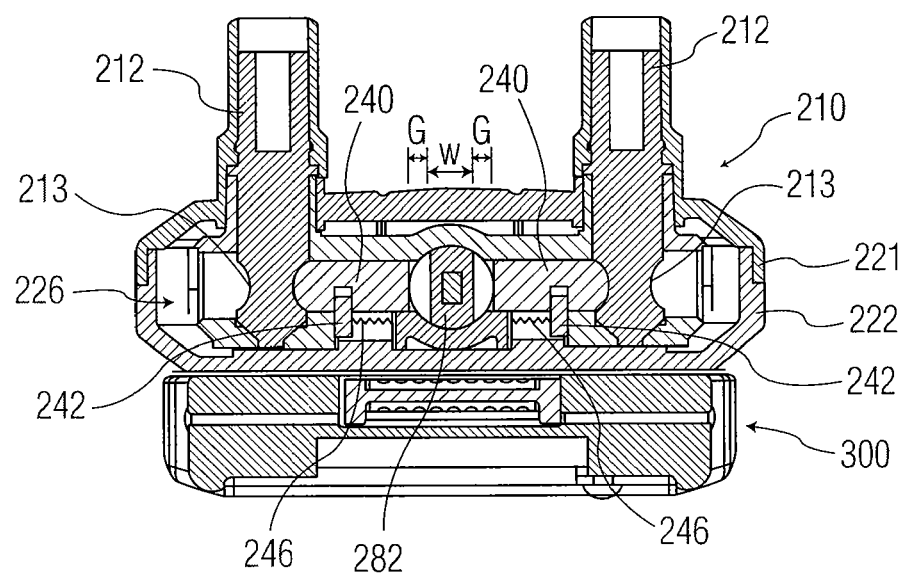
FIG. 15 is a cross-sectional view similar to FIG. 14 illustrating the cam member in an unlocked position.
Figure 16:
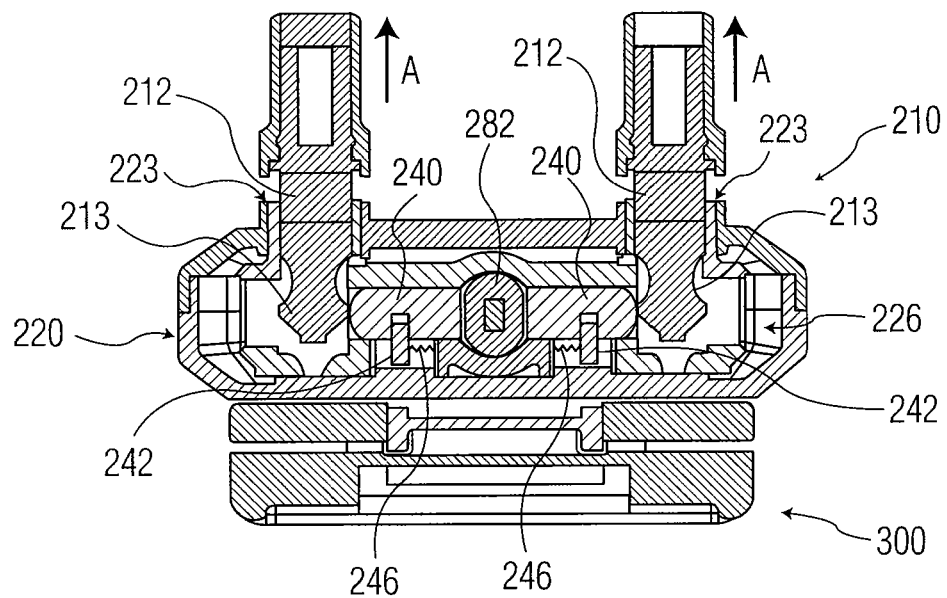
FIG. 16 is a cross-sectional view similar to FIG. 15 illustrating the cable legs as they are removed from the lock body.

The cam member 282 has a generally rectangular configuration and is movable between the locked position as shown in FIG. 14 and the unlocked position shown in FIGS. 15 and 16. In the locked position, the cam member 282 is positioned such that its wider width W extends axially along the dead bolt passage 226. The cam member 282 extends between the dead bolts 240 and prevents them from moving axially inward, thereby locking the dead bolts 240 in engagement with the channels 213 of the legs 212.

Upon insertion of a proper key into the key slot 283 and rotation of a portion of the lock cylinder 280, the cam member 282 is rotated to the unlocked position shown in FIGS. 15 and 16. In this position, the narrow width w of the cam member 282 extends axially along the dead bolt passage 226. As shown in FIG. 15, even with the cam member 282 in the unlocked position, the biasing members 246 maintain the dead is bolts 240 in the axially outward position such that the dead bolts 240 are engaged with the legs 212. However, a gap G is defined between each dead bolt 240 and the reduced width w of the cam member 282. As such, upon application of a removal force upon one of the legs 212, as indicated by arrow A in FIG. 16, the respective dead bolt 240 is forced axially inward against the biasing force based on the contour of the leg channel 213. In this way, the legs 212 are each individually releasable from the respective opening 223, but do not freely release without the application of a removal force.

To resecure a leg 212, the leg 212 is inserted into the opening 223 and the respective dead bolt 240 again moves in response to the contour of the channel 213. Once the leg 212 is fully inserted, the dead bolt 240 is biased back to the locked position as shown in FIG. 15. The cam member 282 may then be rotated back to the locked position shown in FIG. 14 by turning the key in the cylinder 280.

The lock assembly 210 of FIGS. 11-16 is illustrated in conjunction with an exemplary bracket assembly 300. The lock assemblies described above may be used with other bracket assemblies and are not limited to the specifically illustrated bracket assembly 300. Additionally, the bracket assembly 300 illustrated herein may be utilized with locks having various configurations, including various cable locks and U-locks, and is not limited to the cable lock assemblies described herein.

Figure 17:
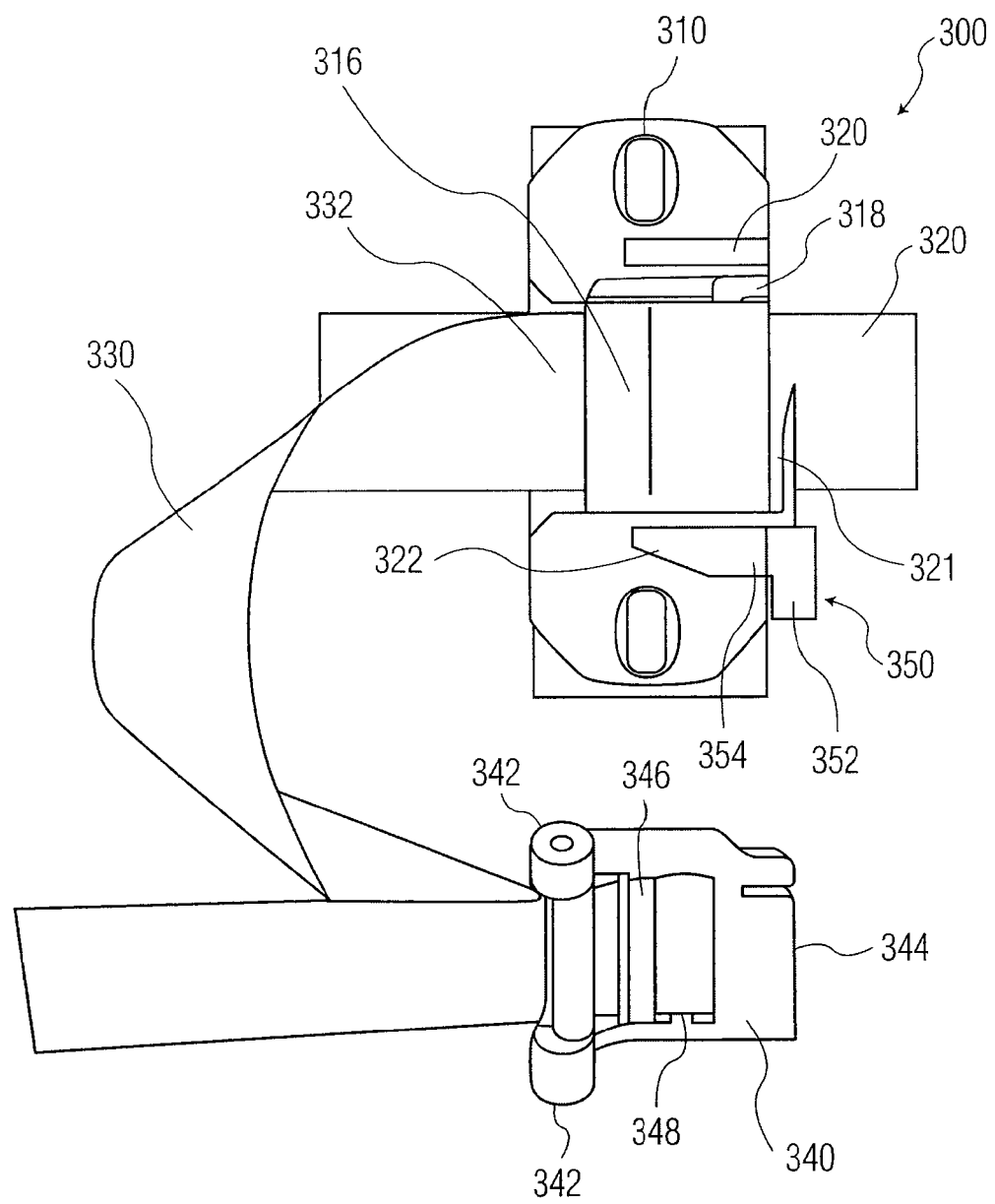
FIG. 17 is a plan view of a bracket assembly in accordance with an alternative embodiment of the present invention.
Figure 18:
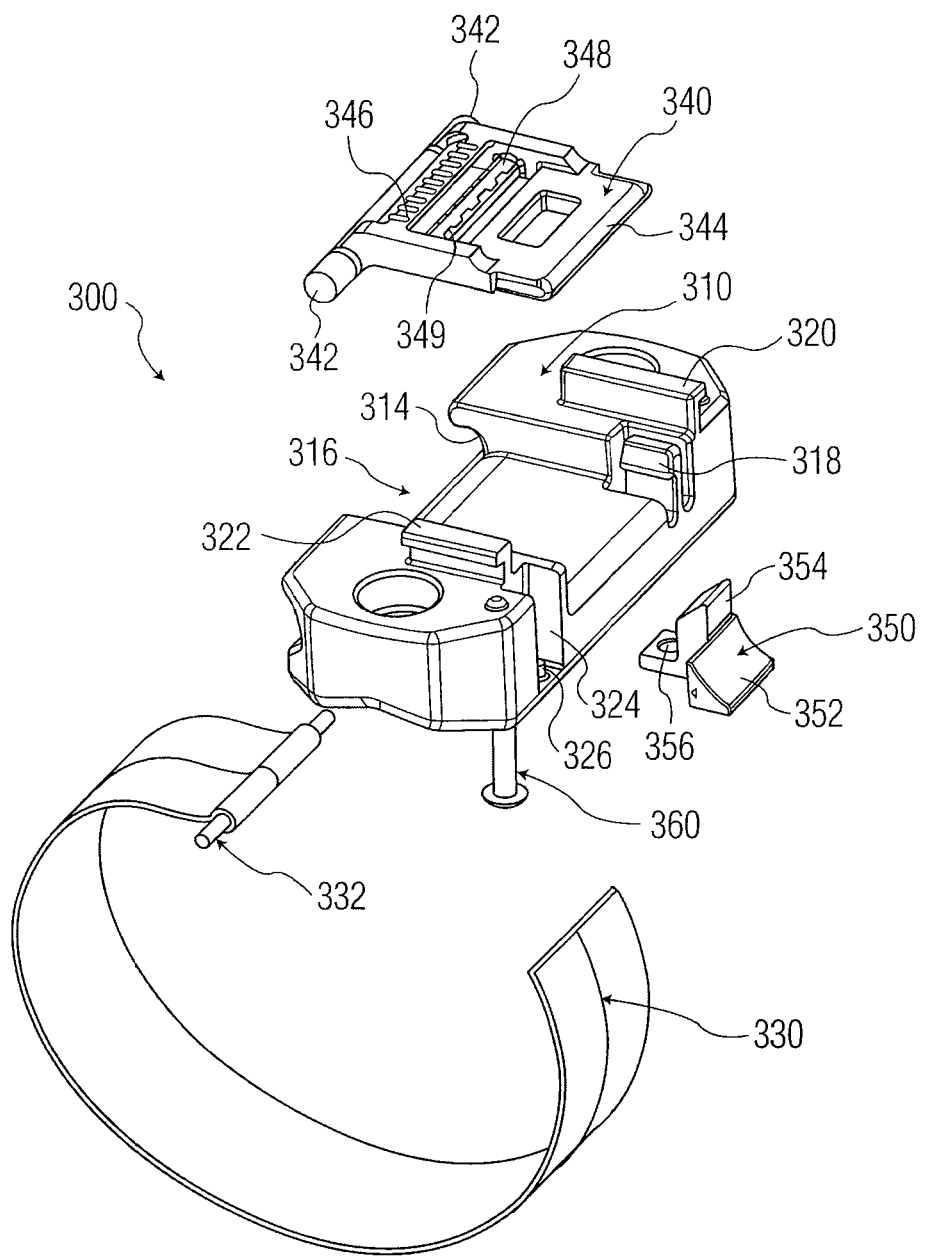
FIG. 18 is an exploded isometric view of the bracket assembly of FIG. 17.
Figure 19:
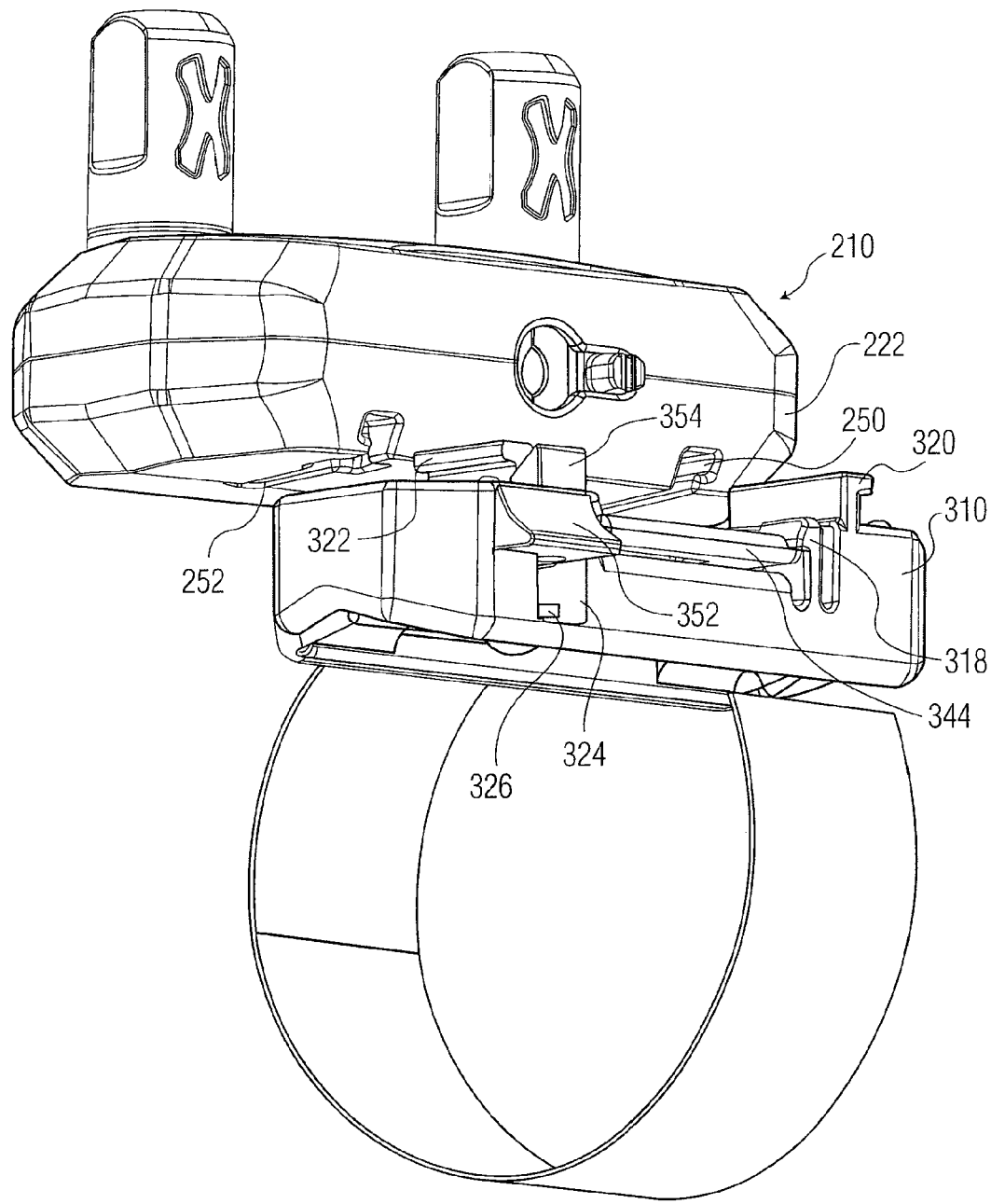
FIG. 19 is a front isometric view of an exemplary lock assembly prior to engagement with the bracket assembly of FIG. 17.
Figure 20:
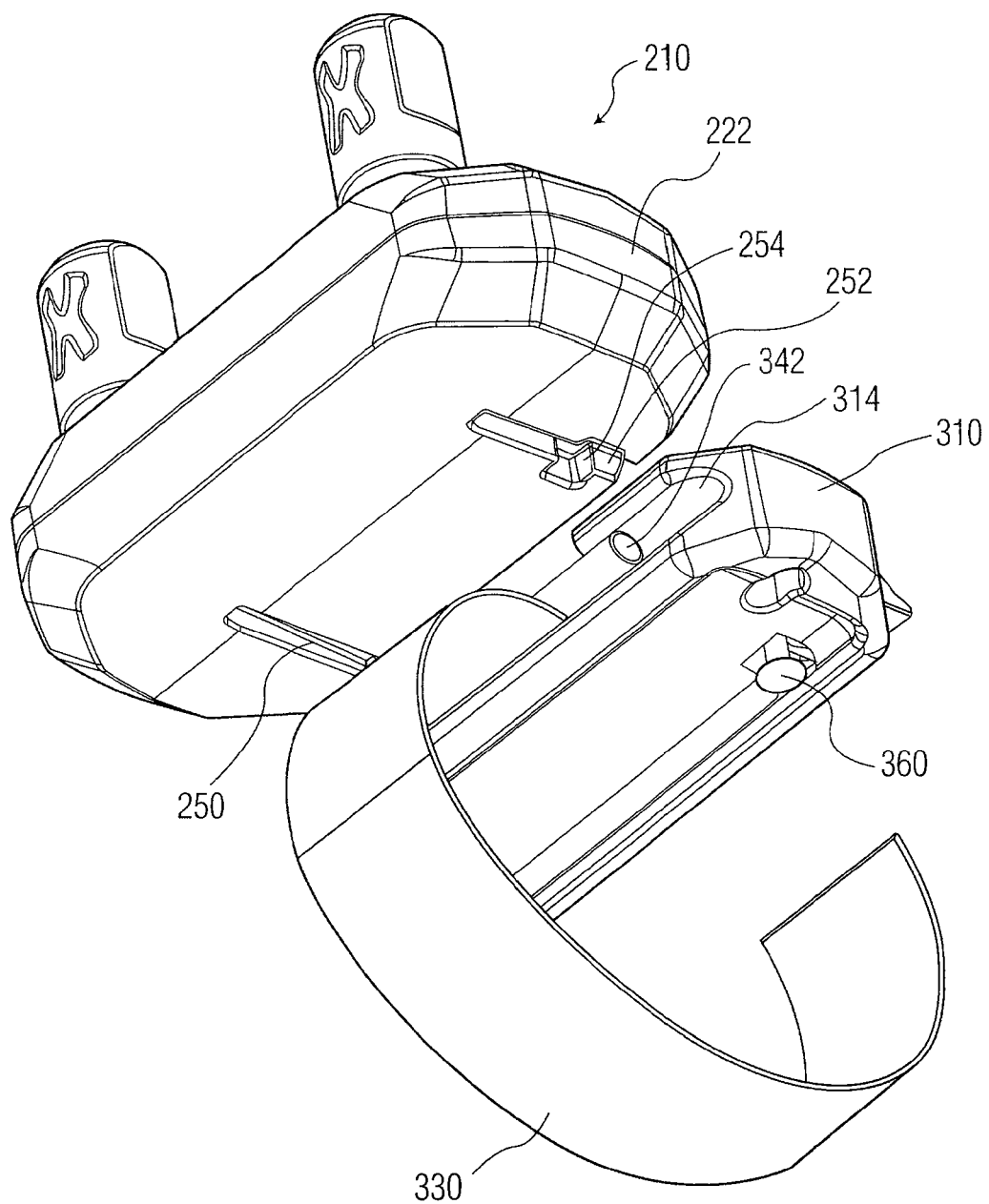
FIG. 20 is a rear isometric view similar to FIG. 19.
Figure 21:
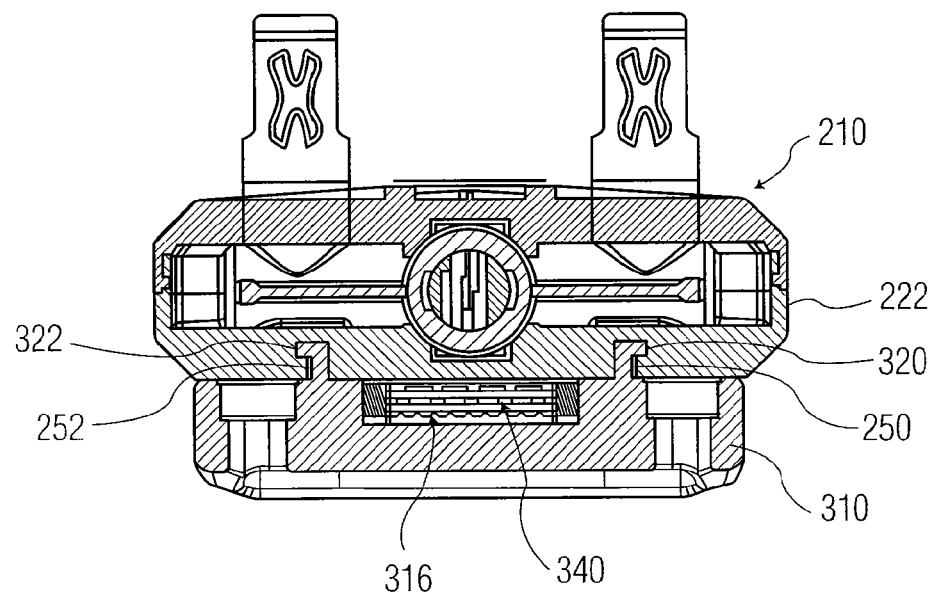
FIG. 21 is a cross-sectional view of an exemplary lock assembly connected to the bracket assembly of FIG. 17.
Figure 22:
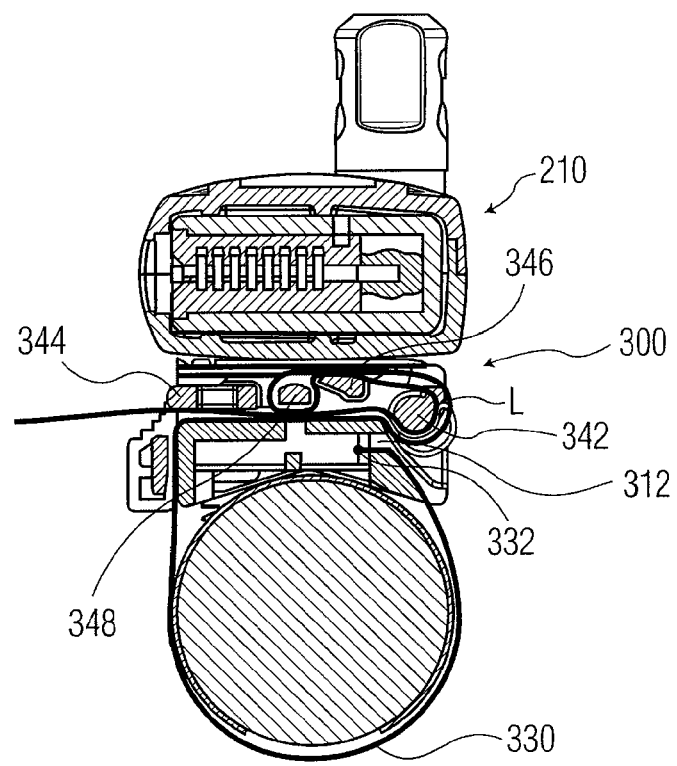
FIG. 22 is a cross-sectional view similar to FIG. 21 but perpendicular thereto.

Referring to FIGS. 17-22, the bracket assembly 300 will be described in detail. The bracket assembly 300 generally includes a bracket body 310 and an adjustable strap 330 configured to engage a buckle 340. Referring to FIGS. 18, 20 and 22, a strap pin 332 is provided at one end of the strap 330. The strap pin 332 is received and retained in a strap groove 312 extending along the rear surface of the bracket body 310. The opposite end of the strap 330 is configured to engage the buckle 340 to thereby secure the bracket body 310 is a bicycle post or the like.

Figure 23:
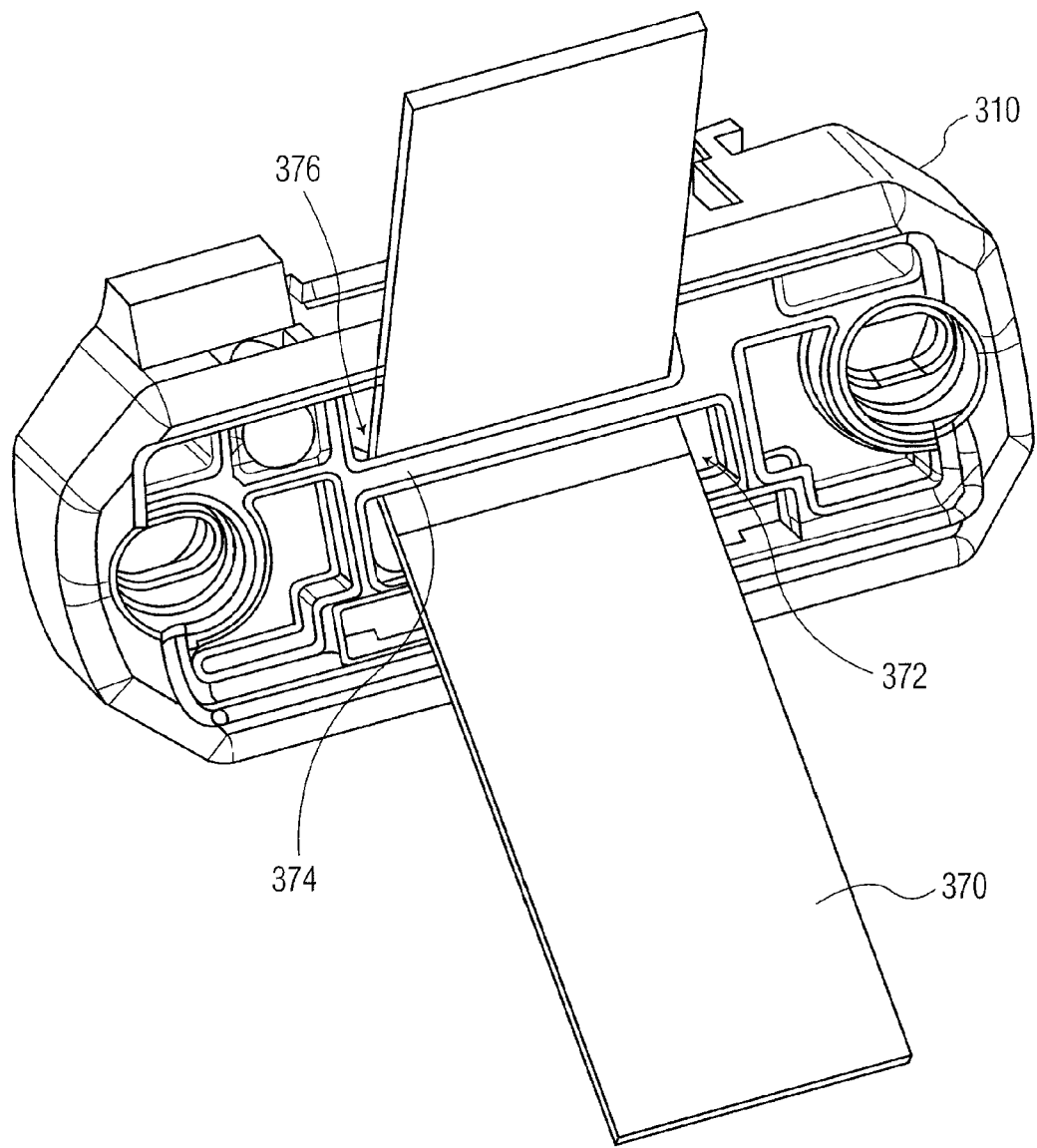
FIG. 23 is a bottom isometric view of the bracket assembly with an elastomeric shim supported thereon.

Referring to FIGS. 17 and 23, an elastomeric shim 370 may be provided to protect the bicycle frame and reduce slipping of the bracket assembly 300. In the present embodiment, a shim notch 372 is provided along the lower surface of the bracket body 310. A shim cross bar 374 extends across the notch 372 to define a shim passage 376 as shown in FIG. 23. The elastomeric shim 370 is fed through the passage 376 and is frictionally retained relative to the bracket body 310. Retainment of the shim 370 in the shim passage 376 ensures that the shim 370 is properly aligned with the strap 330 and simplifies installation as the user does not have to hold the shim 370 in place, but instead simply wraps the strap 330 about the shim 370.

The exemplary buckle 340 includes opposed posts 342 that are received in a buckle groove 314 along the rear surface of the bracket body 310 such that the buckle 340 is pivotally supported in the buckle notch 316 defined along the bracket body 310. The buckle 340 includes a forward lift portion 344 and a rear crossbar 346. An engagement bar 348 extends across the buckle 340 between the lift portion 344 and the rear crossbar 346 such that the lift portion 344, engagement bar 348 and rear crossbar 346 define a tortuous path L (see FIG. 22) for the free end of the strap 330 to pass through. To insert or remove the strap 330 from the tortuous path L, the lift portion 344 is lifted or the strap 330 is pulled up such that the buckle 340 pivots away from the surface of the notch 316. In this position, the strap 330 is free to be moved along the path L. Alternatively, after the buckle 340 is pivoted away from the surface 316, the posts 342 may be disengaged from the buckle groove 314 such that the bracket assembly 300 may be removed without removing the strap 330 from the buckle 340.

To lock the strap 330 in position, with the posts 342 positioned in the buckle groove 314, the buckle 340 is pivoted to a locked position as shown in FIG. 22 wherein the lift portion 344 is adjacent the surface of the notch 316. The body 310 preferably includes a locking tab 318 adjacent to the notch 316 that engages the buckle 340 and retains it in the locked position, as shown in FIG. 17. Upon sufficient force on the lift portion 344, the locking tab 318 biases out of the locked position and allows lifting of the buckle 340. As illustrated in FIG. 18, the surfaces of the lift portion 344, engagement bar 348 and rear crossbar 346 may be provided with teeth 349 or the like to increase the holding force against the strap 330.

Figure 24A:
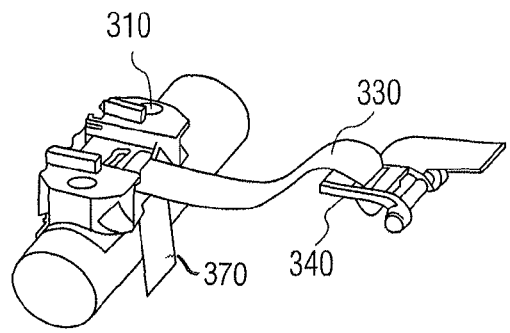
FIGS. 24A-24H illustrate an exemplary method of attaching the bracket assembly of FIG. 17.
Figure 24B:
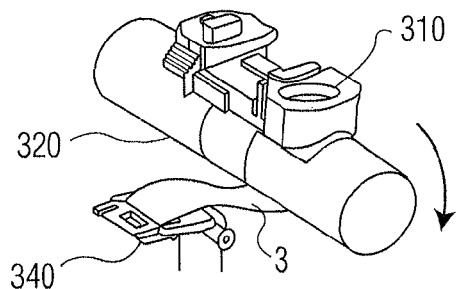
Figure 24C:
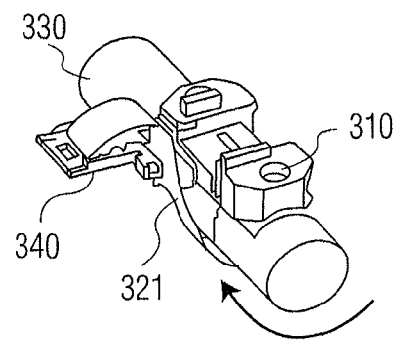
Figure 24D:
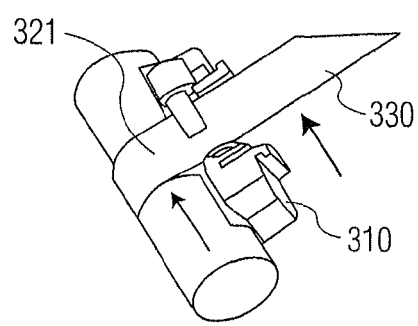
Figure 24E:
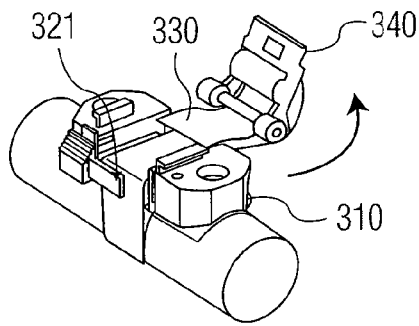
Figure 24F:
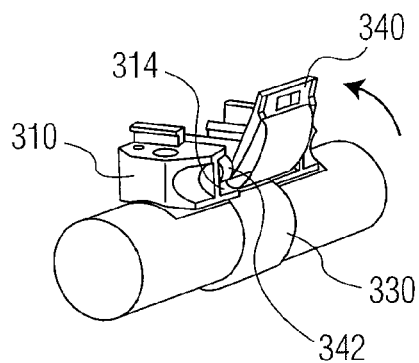
Figure 24G:
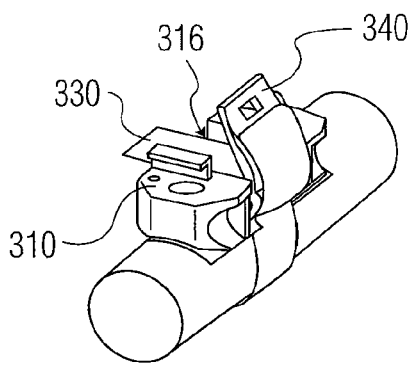
Figure 24H:
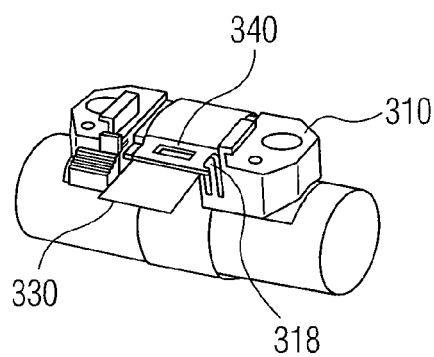

While the strap 330 may be fed through and secured via the buckle 340 after the buckle 340 is attached to the bracket body 310, FIGS. 24A-24H illustrate an alternative attachment method wherein the strap 330 is threaded through the buckle 340 prior to attachment of the buckle 340 to the bracket body 310. The bracket body 310 is placed on to the bicycle frame at a desired location and the shim 370 is held about the frame tube as illustrated in FIG. 24A. The strap 330 is then wrapped around the frame tube covering the shim 370 as shown in FIG. 24B. As the strap 330 is wrapped around, a portion of the strap 330 is slid into the strap retainer slot 321 on the side of the bracket body 310 as illustrated in FIGS. 24C and D. This helps hold the strap 330 in position making it easier to complete the final mounting procedure. Holding the buckle 340 end, the strap 330 is wrapped over-up to the top of the bracket body 310 as shown in FIG. 24E. The buckle posts 342 are positioned into the buckle groove 314 on the bracket body 310 as shown in FIG. 24F. The free end of the strap 330 is placed on top of the portion of the strap extending through the buckle notch 316 as shown in FIG. 24G. The buckle 340 is closed over the two layers of the strap 330 so that it is at an approximately 90 degree position. There should be moderate tension on the strap 330 at this point. If not, the length of strap 330 extending through the buckle 340 may be adjusted. With the desired length of strap 330, the buckle 340 is pivoted into engagement with bracket body 310 until the buckle 340 engages the locking tab 318 as shown in FIG. 24H. With both methods of assembly, the bracket assembly 300 may be secured tightly to the bicycle frame without any tools.

Alternatively, one or more screws 360 may be utilized to threadably mount the bracket body 310 to a bicycle frame, for example, at the customary frame mount positions.

A pair of L-flanges 320 and 322 extend from the upper surface of the bracket body 310 and are configured to engage corresponding grooves 250 and 252 on the lock body 220. In the illustrated embodiment, the grooves 250 and 252 are provided in the cover 222 of the lock assembly 210. Again, the bracket assembly 300 is not limited to use with this lock configuration and may be used with any lock assembly having appropriately positioned grooves. Referring to FIGS. 19-21, the lock assembly 210 is connected to the bracket assembly 300 by sliding the flanges 320 and 322 into the respective grooves 250 and 252. A slide fit is preferably provided to minimize rattling between the components. Alternatively or in addition thereto, one or more elastomeric members (not shown) may be provided between the flanges 320 and 322 and the grooves 250 and 252 to minimize rattling.

In the present embodiment, a slide lock 350 is provided to further secure the lock assembly 210 relative to the bracket body 310. The slide lock 350 includes a contact portion 354 received in a slide groove 324 provided in the bracket body 310 adjacent to the flange 322. The slide groove 324 guides axial movement of the slide lock 350. A handle portion 352 extends from the contact portion 354 and is positioned outside of the groove 324 such that a user may move the slide lock 350. A spring or the like (not shown) extends between a post 326 within the groove 354 and a receiving detent 356 or the like on the slide lock 350 to bias the slide lock 350 to a locked position wherein the contact portion 354 extends above the upper surface of the bracket body 310 as shown in FIG. 19.

In the locked position, the contact portion 354 is configured to engage a contact surface 254 within the groove 252 (see FIG. 20). As the lock assembly 210 is engaged with the bracket assembly 300, the slide lock 350 recesses into the groove 324. Upon full connection, the slide lock 350 is biased to the locked position wherein the contact portion 354 engages the contact surface 254, thereby preventing inadvertent sliding between the components. To release the lock assembly from the bracket assembly 300, a user depresses the slide lock 350 via handle 352, thereby permitting sliding disengagement of the lock assembly from the flanges 320 and 322.

Figure 25:
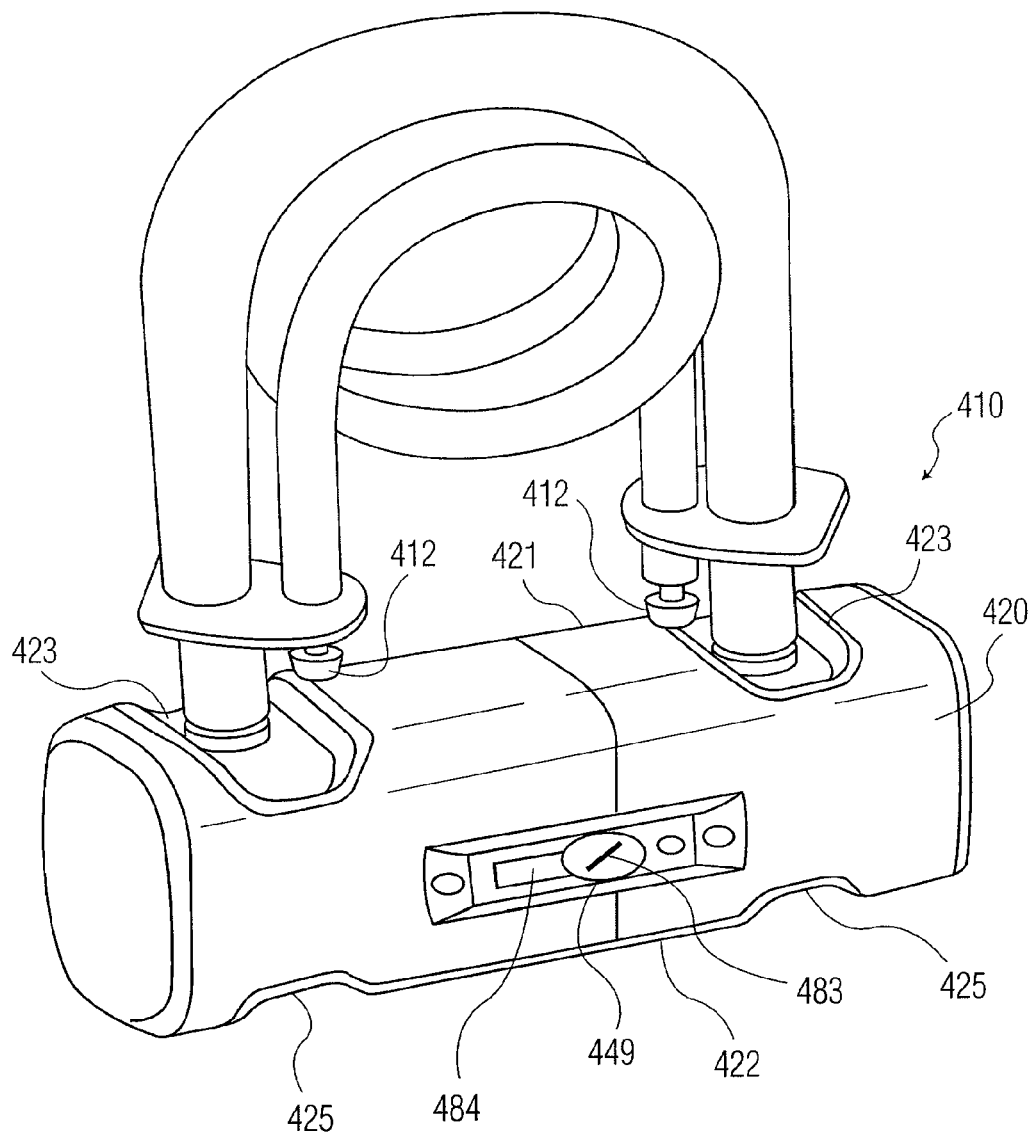
FIG. 25 is an isometric view of another exemplary lock assembly of the present invention.
Figure 26:
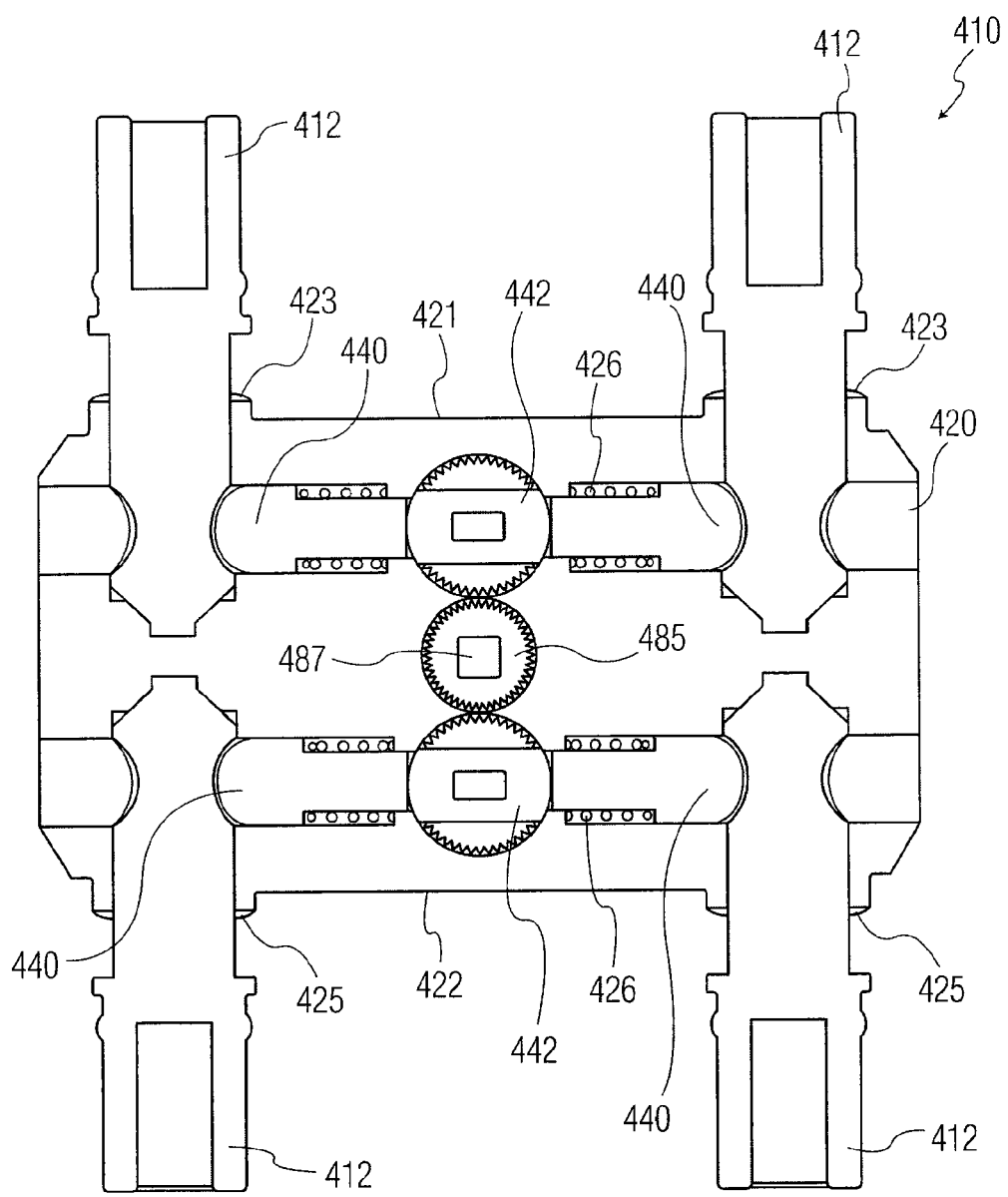
FIG. 26 is a cross-sectional view of the lock assembly of FIG. 25 in a locked condition.

Referring to FIGS. 25 and 26, a lock assembly 410 that is an alternate embodiment of the invention is shown. The lock assembly 410 includes a lock body 420 with opposed surfaces 421 and 422. A pair of locking member openings 423 are defined through surface 421 of the lock body 420 and a pair of locking member openings are defined through surface 422 of the lock body 420. While the surfaces 421 and 422 are opposed in the present embodiment, they do not have to be, but may instead be adjacent to one another. Furthermore, a pair of openings 423, 425 is illustrated on two surfaces 421, 422, opening pairs may be provided on more than two surfaces. Each opening 423, 425 is configured to receive a locking leg 412 of a lock member. The lock members can be of various forms including, but not limited to, U-locks, cables, and chains, as will be described in more detail hereinafter. The lock body 420 includes an opening 449 in which is aligned the key slot 483 of a key lock cylinder (not shown) configured to receive a key (not shown) to unlock the lock assembly 410. A cover 484 may be slidably positioned relative to the opening 449 to selectively cover the key slot 483. The lock assembly 410 of the present embodiment is described with a mechanical actuator, but may also or alternatively include an electronic actuator similar to that described above.

An inner housing similar to that described with respect to FIGS. 11-16 is provided within the lock body 420, however, the inner housing defines leg openings aligned with each of the openings 423, 425 and defines two dead bolt passages 426 perpendicular to and in communication with the leg openings. Each dead bolt passage 426 is configured to axially support a pair of dead bolts 440. A cam member is supported in each dead bolt passage 426 between the respective dead bolts 440. In the present exemplary embodiment, each cam member is supported by a gear member 442 with a toothed surface. A key gear 485 with a toothed surface is supported between the cam gear members 442 in alignment with the lock cylinder and receives a keyed portion 483 of the lock cylinder such that rotation of a key in the lock cylinder causes the key gear 485, and thereby the cam gear members 442 and cam members, to rotate. Other means of simultaneously or independently rotating the cam members may be provided. The dead bolts 440 otherwise operate in the same manner as described above with respect to FIGS. 11-16.

With the modular assembly of the present invention, various lock members, for example, cables 11, chains 15, U-bars 17, can be used with the lock bodies 20, 220, 420 for various locking configurations.

Figure 27A:
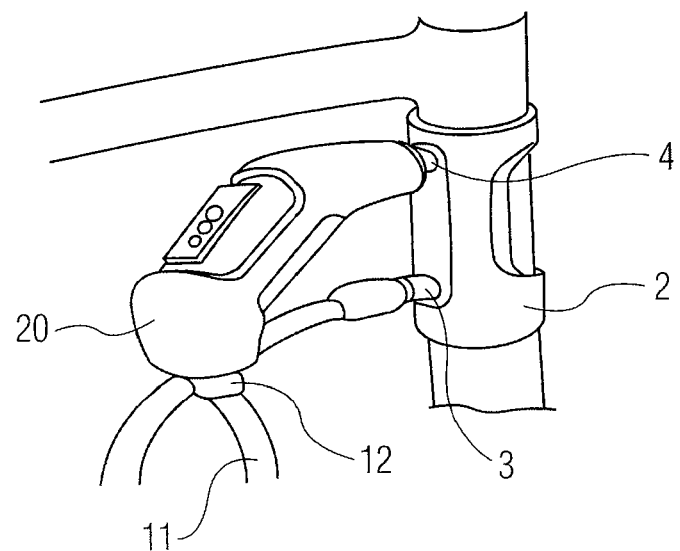
FIGS. 27A-27F illustrate various exemplary modular configurations in which the lock assemblies of the present invention may be utilized.
Figure 27B:
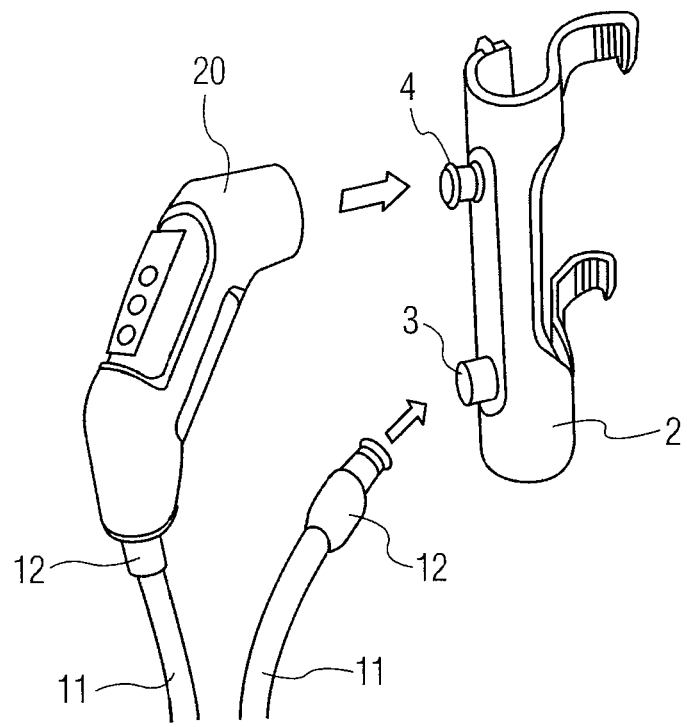
Figure 28A:
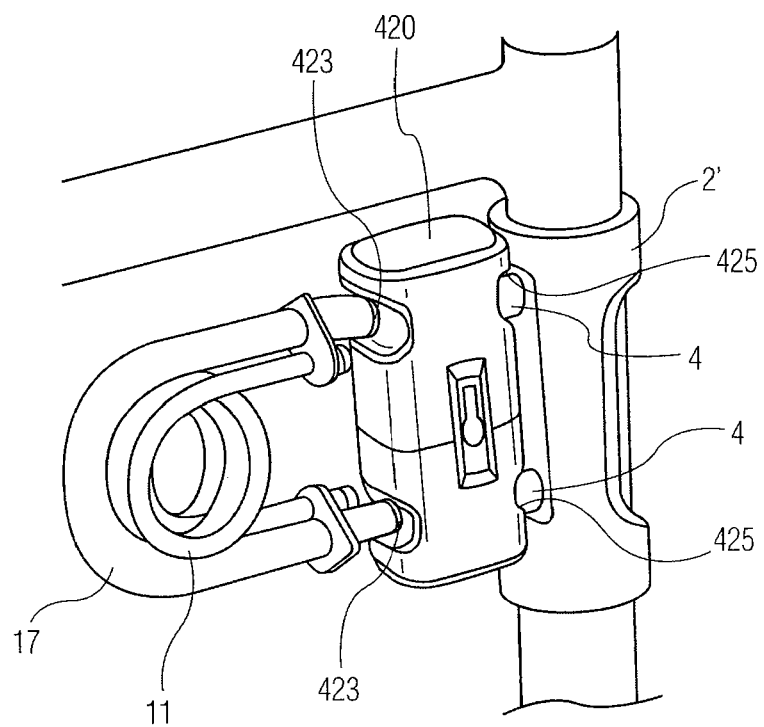
FIGS. 28A-28H illustrate various exemplary modular configurations in which the lock assemblies of the present invention may be utilized.
Figure 28B:
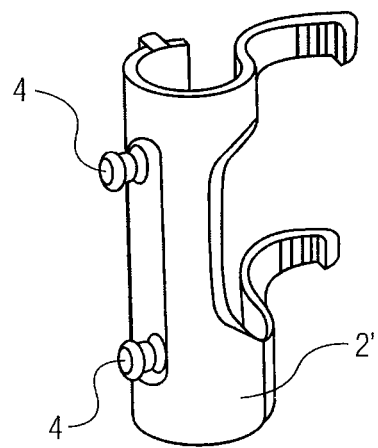

For example, referring to FIGS. 27A and 27B, the lock body 20, 220 can be rigidly mounted to the frame using a post and plug bracket 2 strapped around the frame. One of the posts 4 locks into the lock body 20, 220 and the locking leg 12, 212 into the bracket opening 3 to prevent detachment in use. Similarly, as illustrated in FIGS. 28A and 28B, the lock body 420 may be supported by a double post bracket 2' which is strapped or otherwise attached to the frame. A pair of posts 4 extend from the bracket 2', with each post 4 configured to be received and secured in one of lock openings 423, 425.

Figure 27C:
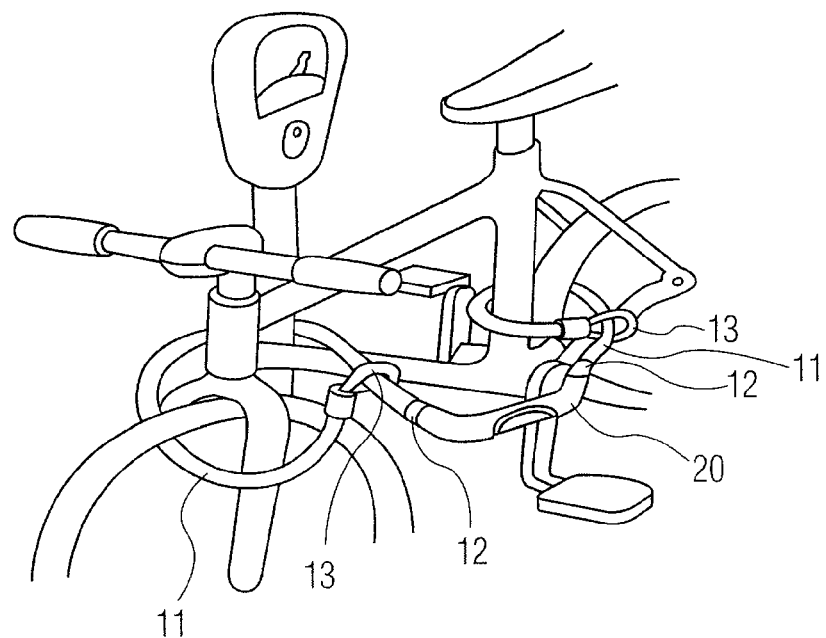
Figure 27D:
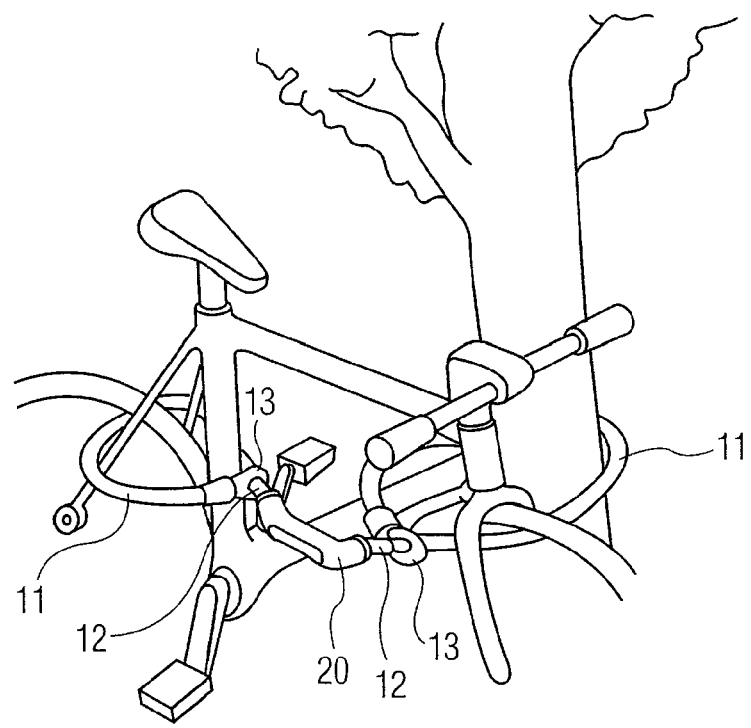
Figure 28C:
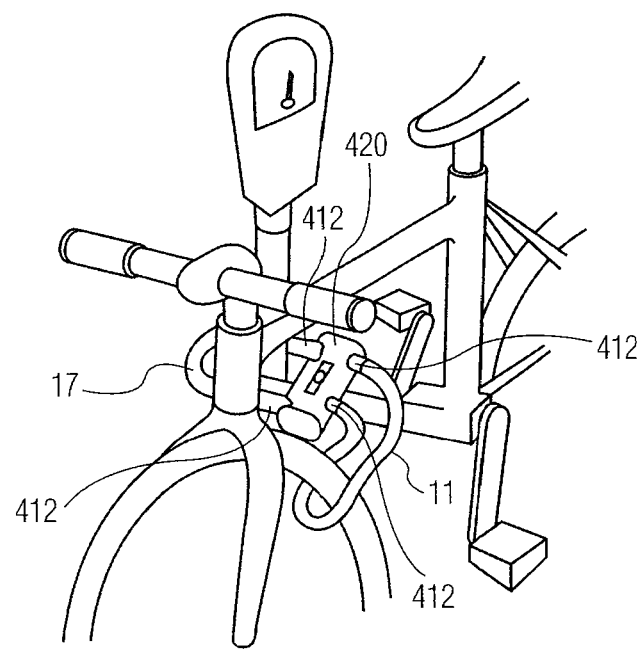
Figure 28D:
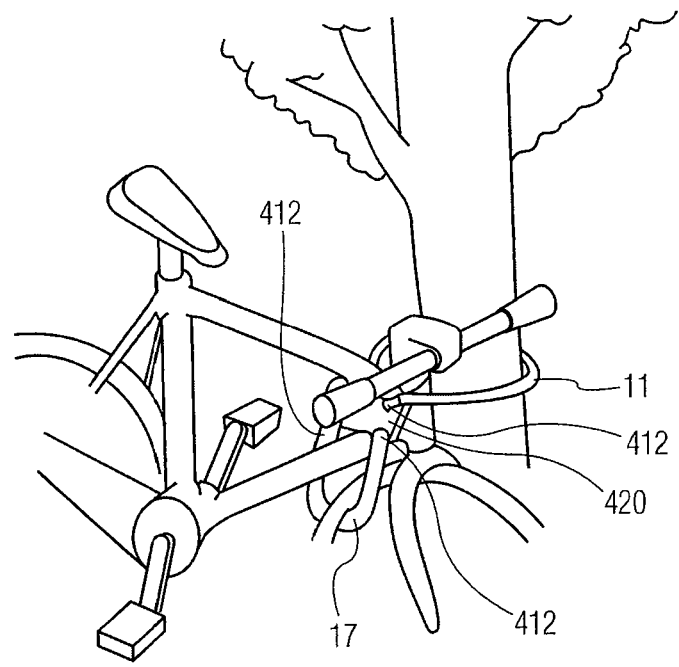
Figure 28E:
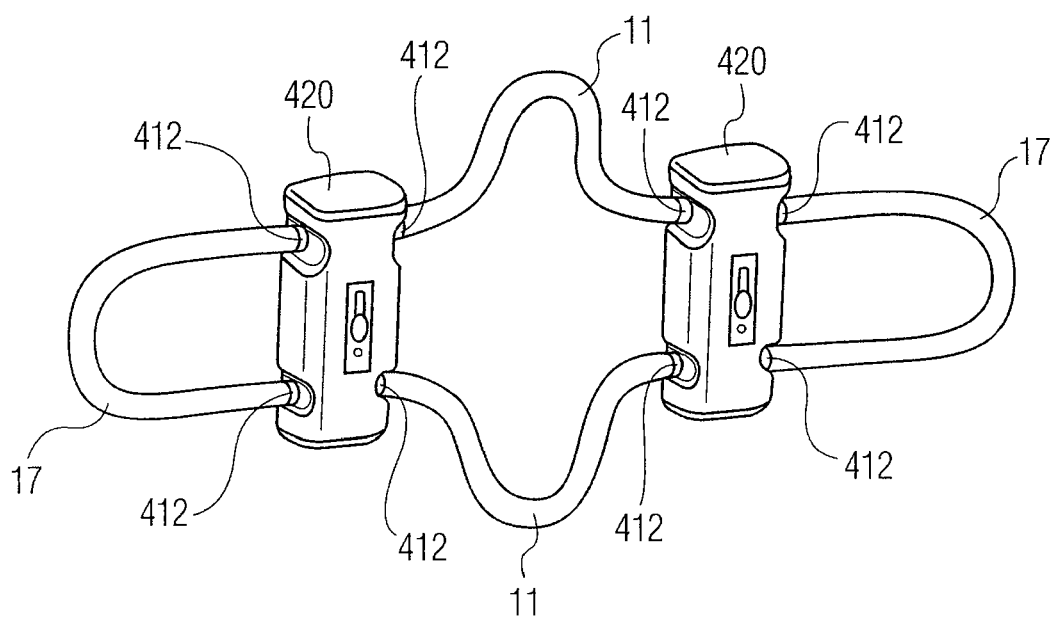
Figure 28F:
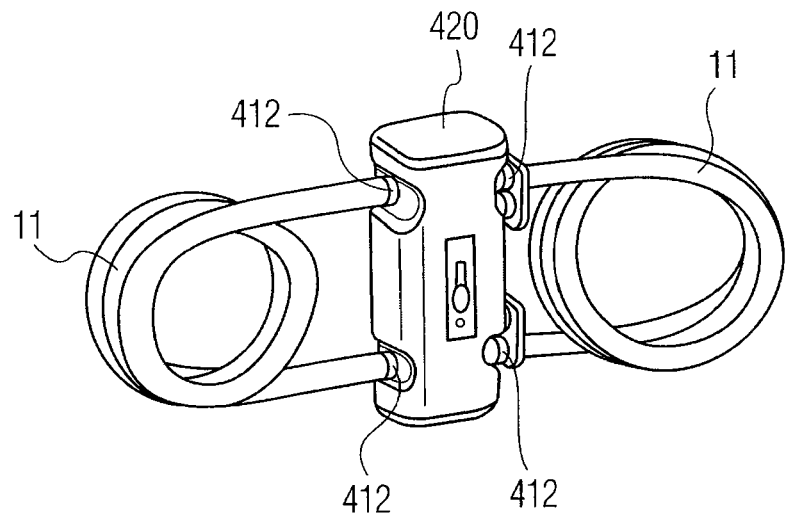
Figure 28G:
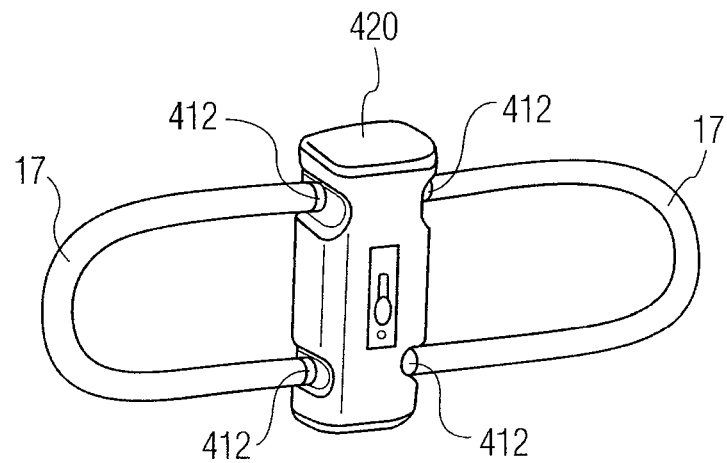
Figure 28H:
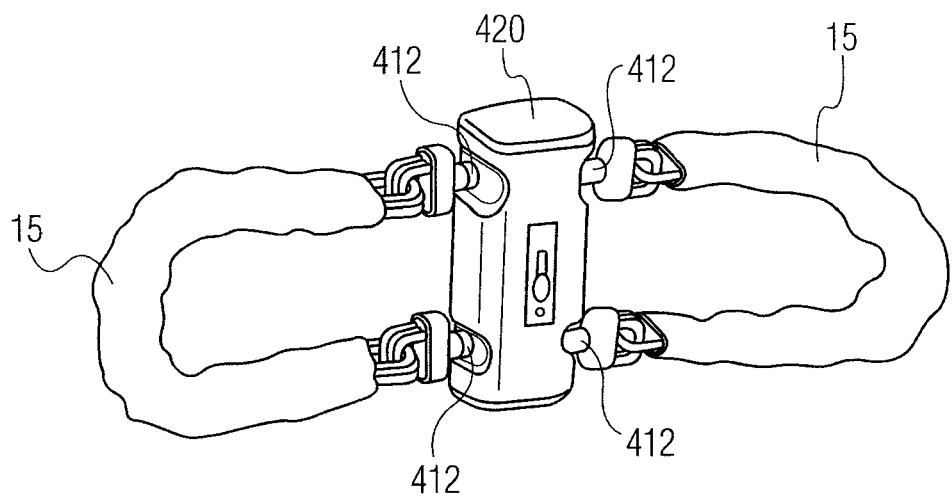

In the exemplary use as illustrated in FIGS. 27C and 27D, two cables 11 with loops 13 may be used with the lock body 20, 220. Each looped cable 11 can be looped through the loop 13 and then have the leg 12, 212 secured to the lock body 20, 220 such that different parts of the bike can be secured to a post and or tree trunk providing added functionality compared to traditional cable locks. Similarly, FIGS. 28C and 28D illustrate an exemplary use of lock body 420 with a U-bar 17 and a cable 11, each with a pair of legs 412. In FIG. 28C, the U-bar 17 extends about a post and connects to the lock body 420 while the cable 11 extends around the bicycle tire and connects to the lock body 420. In FIG. 28D, the cable 11 extends about a tree and connects to the lock body 420 while the U-bar 17 extends around the bicycle tire and connects to the lock body 420. FIGS. 28E through 28H show exemplary component combinations, but the invention is not limited to such combinations and may have any number of combinations. FIG. 28 E, shows a pair of lock bodies 420 joined by cables 11 and each lock body 420 further securing a respective U-bar 17. FIG. 28F shows a lock body 420 securing a pair of cables 11. FIG. 28G shows a lock body 420 securing a pair of U-bars 17. FIG. 28H shows a lock body 420 securing a pair of chains 15. In each case, the locking members (cables, chains, U-bars, etc.) have legs 412 configured to be received in the lock body openings 423, 425.

Figure 27E:
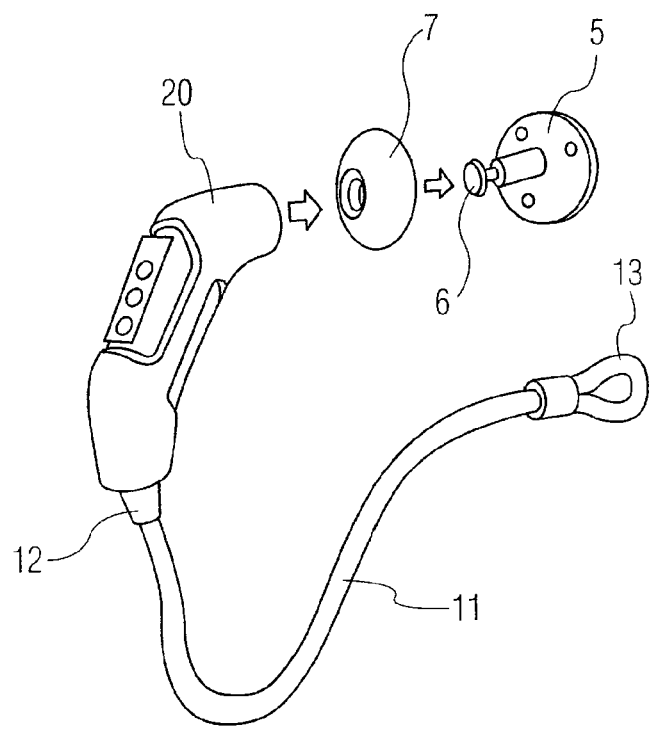
Figure 27F:
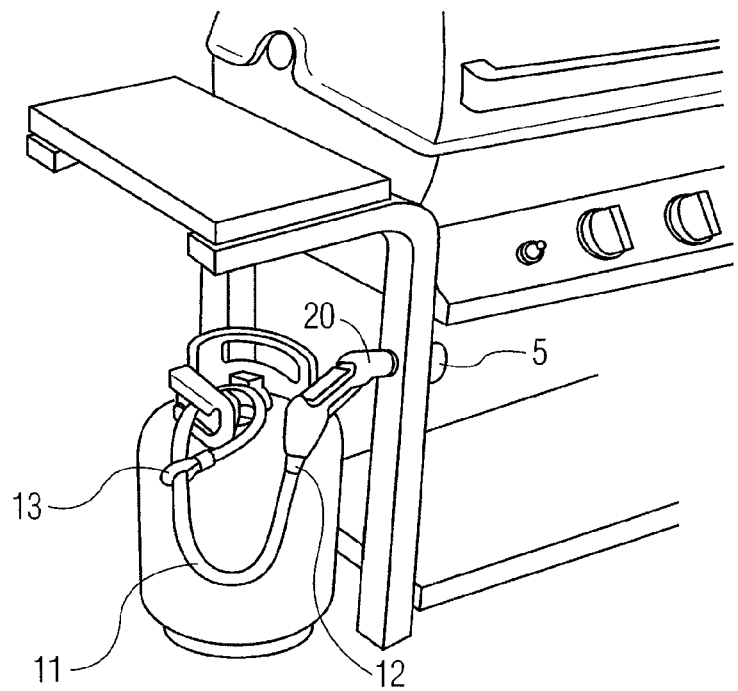

Alternatively, as illustrated in FIGS. 27E and 27F, the lock body 20, 220 can be used to secure items to a wall via a bracket mount 5. A shroud 7 covers the wall mount screws (not shown) exposing a pin 6 for the lock body 20, 220 to attach. The cable 11 has one end with a locking leg 12, 212 and the other end with a loop 13 such that the cable 11 can be fed through the loop 13 and the locking leg 12, 212 secured in the lock body 20, 220. Similar wall mounts may also be utilized with the lock body 420.

In one aspect, the present invention provides a lock assembly comprising: a length of non-rigid lock material having opposed ends with a locking leg on each end; and a lock body having an internal lock mechanism and defining at least two locking leg openings, each locking leg opening configured to receive a respective locking leg and associated with the lock mechanism such that a locking leg positioned in the respective locking leg opening may be releasably secured by the locking mechanism.

In another aspect, the present invention provides a lock assembly body comprising: a housing having first and second surfaces, a pair of spaced apart first locking leg openings defined along the first surface and a pair of spaced apart second locking leg openings defined along the second surface, each of the first and second locking leg openings configured to receive a locking leg of a locking member; and a lock mechanism within the housing and associated with each of the first and second locking leg openings such that a locking leg positioned in the respective locking leg opening may be releasably secured by the locking mechanism.

In yet another aspect, the present invention provides a bracket for supporting a lock assembly on a moveable object, the bracket comprising: a body defining a lock assembly retaining mechanism and having a buckle groove; a buckle defining a retaining path therethrough, the buckle including a portion configured to be pivotally received in the buckle groove such that the buckle is pivotal between an open position and a closed position; and a strap having a first end attached to the body and a second end passed through the retaining path, wherein in the open position the strap is adjustable within the retaining path and in the closed position the strap is fixed relative to the buckle.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A lock assembly body comprising:
   a housing having first and second surfaces, a pair of spaced apart first locking leg openings defined along the first surface and a pair of spaced apart second locking leg openings defined along the second surface, each of the first and second locking leg openings configured to receive a locking leg of a locking member;
   a lock mechanism within the housing and associated with each of the first and second locking leg openings such that a locking leg positioned in the respective locking leg opening may be releasably secured by the lock mechanism;
   wherein the lock mechanism includes a contact member associated with each locking leg opening, each contact member moveable between a retaining position wherein the contact member engages and retains a respective locking leg and a release position wherein the locking leg may be released from the housing; and
   a first and a second lock actuator, the first lock actuator engaging the contact members associated with the first locking leg openings and the second lock actuator engaging the contact members associated with the second locking leg openings, wherein the first and the second lock actuator are moveable from between a retaining orientation, where the contact members can not be moved from the retaining position, and a release orientation, where the contact members may be moved from the retaining position to the release position, and wherein the first and the second lock actuators are simultaneously controlled between the retaining orientation and the release orientation.

2. The lock assembly body according to claim 1 further comprising the locking member, wherein the locking member is selected from a group comprising a cable, a chain and a U-bar.

3. The lock assembly body according to claim 1 wherein the contact members are biased toward the retaining position.

4. The lock assembly body according to claim 1 wherein the contact members are biased toward the retaining position and each contact member remains in engagement with the respective locking leg even when the lock actuator is in the release orientation and only moves to the release position upon the application of a releasing force on the respective locking leg.

5. The lock assembly body according to claim 1 wherein the lock actuators are controlled mechanically, electrically or a combination thereof.

6. A lock assembly body comprising:
   a housing having first and second surfaces, a pair of spaced apart first locking leg openings defined along the first surface and a pair of spaced apart second locking leg openings defined along the second surface, each of the first and second locking leg openings configured to receive a locking leg of a locking member;
   a lock mechanism within the housing and associated with each of the first and second locking leg openings such that a locking leg positioned in the respective locking leg opening may be releasably secured by the lock mechanism;
   wherein the lock mechanism includes a contact member associated with each locking leg opening, each contact member moveable between a retaining position wherein the contact member engages and retains a respective locking leg and a release position wherein the locking leg may be released from the housing;
   a first and a second lock actuator, the first lock actuator engaging the contact members associated with the first locking leg openings and the second lock actuator engaging the contact members associated with the second locking leg openings, wherein the first and the second lock actuator are moveable from between a retaining orientation, where the contact members can not be moved from the retaining position, and a release orientation, where the contact members may be moved from the retaining position to the release position, and wherein the first and the second lock actuators are simultaneously controlled between the retaining orientation and the release orientation; and
   wherein the contact members are biased toward the retaining position and each contact member remains in engagement with the respective locking leg even when the corresponding lock actuator is in the release orientation and only moves to the release position upon the application of a releasing force on the respective locking leg.

* * * * *